United States Patent [19]
Enge et al.

[11] Patent Number: 6,031,882
[45] Date of Patent: Feb. 29, 2000

[54] ADAPTIVE EQUALIZATION OF MULTIPATH SIGNALS

[75] Inventors: Per Enge, Mountain View; Dominic Farmer, Milpitas; John F. Schipper, Palo Alto, all of Calif.

[73] Assignee: Trimble Navigation Limited, Sunnyvale, Calif.

[21] Appl. No.: 08/851,873

[22] Filed: May 6, 1997

Related U.S. Application Data

[63] Continuation of application No. 08/277,150, Jul. 19, 1994, Pat. No. 5,630,208.

[51] Int. Cl.$^7$ .................................................. H04L 27/06
[52] U.S. Cl. ............................................................ 375/343
[58] Field of Search .................................... 375/208, 209, 375/210, 232, 343, 346, 348, 349, 350; 455/65, 506, 296

[56] References Cited

U.S. PATENT DOCUMENTS

| | | | |
|---|---|---|---|
| 3,537,008 | 10/1970 | Lakatos | 325/65 |
| 3,542,954 | 11/1970 | Flanagan | 179/1 |
| 3,566,035 | 2/1971 | Noll et al. | 179/1 |
| 3,596,182 | 7/1971 | Menard | 325/67 |
| 3,605,018 | 9/1971 | Coviello | 325/65 |
| 3,662,108 | 5/1972 | Flanagan | 179/1 SA |
| 3,869,673 | 3/1975 | Close | 325/393 |
| 3,956,585 | 5/1976 | Butler et al. | 178/7.3 R |
| 4,053,932 | 10/1977 | Yamaguti et al. | 358/167 |
| 4,127,874 | 11/1978 | Iwasawa et al. | 358/167 |
| 4,314,277 | 2/1982 | Pritchard et al. | 358/167 |
| 4,349,915 | 9/1982 | Costas | 375/40 |
| 4,364,093 | 12/1982 | Holmes | 358/167 |
| 4,457,007 | 6/1984 | Gutleber | 375/102 |
| 4,669,091 | 5/1987 | Nossen | 375/14 |
| 4,672,638 | 6/1987 | Taguchi et al. | 375/99 |
| 4,797,950 | 1/1989 | Rilling | 455/276 |
| 5,065,242 | 11/1991 | Dieterich et al. | 358/167 |
| 5,081,643 | 1/1992 | Schilling | 375/1 |
| 5,111,298 | 5/1992 | Koo | 358/187 |
| 5,121,211 | 6/1992 | Koo | 358/187 |
| 5,127,051 | 6/1992 | Chan et al. | 380/49 |
| 5,142,551 | 8/1992 | Borth et al. | 375/7 |
| 5,159,708 | 10/1992 | Nakamura et al. | 455/214 |
| 5,164,959 | 11/1992 | Cai et al. | 375/1 |
| 5,196,936 | 3/1993 | Kobayashi et al. | 358/167 |
| 5,203,016 | 4/1993 | Belcher et al. | 455/52.3 |
| 5,218,359 | 6/1993 | Minamisono | 342/383 |
| 5,241,317 | 8/1993 | Howard | 342/149 |
| 5,303,264 | 4/1994 | Ohsawa | 375/12 |
| 5,402,450 | 3/1995 | Lennen | 375/343 |
| 5,414,729 | 5/1995 | Fenton | 375/209 |
| 5,465,413 | 11/1995 | Enge et al. | 455/307 |
| 5,493,588 | 2/1996 | Lennen | 375/343 |

*Primary Examiner*—Don N. Vo
*Attorney, Agent, or Firm*—John F. Schipper

[57] ABSTRACT

Method and apparatus for using a plurality of correlators to improve the estimate of direct signal arrival time by identifying detailed features of a correlation function at and adjacent to the correlation peak. The errors in location of the center point of a correlation function R(τ), formed by the received signal and a stored copy of the expected signal, are assumed to be strongly correlated for narrow sample spacing and wide sample spacing of the correlation function. Alternatively, the multipath signal strengths and phases are estimated by a least mean squares analysis, using multiple sampling of a correlation function of an expected signal and an arriving composite signal that includes the direct signal and one or more multipath signals. Times of arrival or path delays of the direct signal and the multipath signals are determined separately. Path delays can be determined by at least three approaches: (1) identification of slope transition points in the correlation function R(τ); (2) Cepstrum processing of the received signal, using Fourier transform and inverse transform analysis; and (3) use of a grid of time shift points for the correlation function, and identification of time shift values, associated with certain solution parameters for a least mean squares analysis that have the largest absolute values, as times of arrival of the direct and multipath signals. Separate identification of path delays reduces the least mean squares analysis to a solvable linear problem. A modified received signal is constructed, with multipath signal(s) approximately removed.

2 Claims, 21 Drawing Sheets

ADAPTIVE EQUALIZATION OF MULTIPATH SIGNALS

This Application is a continuation of U.S. patent application Ser. No. 08/277,150 filed Jul. 19, 1994 which is now U.S. Pat. No. 5,630,208.

FIELD OF THE INVENTION

This invention relates to adaptive equalization of, and compensation for, multipath electromagnetic wave signals received and used for navigation and similar purposes.

BACKGROUND OF THE INVENTION

Many sophisticated navigation systems rely upon receipt of a sequence of electromagnetic wave signals, such as radio wave signals, from signal sources that may be tens of miles to thousands of miles from the receiver. The signals may be reflected or otherwise affected and thus arrive at the receiver as two or more multipath signals displaced in time from each other. Ideally, the receiver will either severely discriminate against all but one of these replicas; or the receiver will equalize and/or compensate for the time delays and shape distortions present in the composite signal.

Several workers have proposed approaches for reducing or removing multipath signal errors. Lakatos, in U.S. Pat. No. 3,537,008, distinguishes between a direct or "specular" path from transmitter to receiver and one or more "echo" paths that provide multipath signals for that transmission. A modulated pilot signal is transmitted together with a message signal, and arrival of the known modulated signal is continuously monitored at the receiver. The modulated signal is of finite length and acts as a timing signal to open and close a gate at the receiver. The contemporaneously transmitted direct signal is admitted through the gate, but later arriving echo signals are not admitted. This system uses two parallel signal processing paths at the receiver, one path containing a phase locked loop for recognition of the modulated signal. If an echo signal arrives before the receiver gate closes, a portion of the echo signal will also be admitted and treated as part of the direct message signal.

Decomposition of the arriving signal into selected contiguous but nonoverlapping frequency intervals to reduce multipath signal error is disclosed in U.S. Pat. No. 3,542,954, issued to Flanagan. The transmitted direct signal and any echo signals are received and normalized at a plurality of spaced apart transducers, at each of which this frequency decomposition occurs. Among the transducers, the maximum signal in each frequency interval is chosen, and a composite direct signal at the intended receiver is constructed from this maximum signal set.

U.S. Pat. No. 3,566,035, issued to Noll et al, discloses use of the "complex cepstrum" (Fourier transform of the logarithm of the power spectrum plus phase angle) of short time interval, partly overlapping segments of a transmitted signal to determine periodicity or aperiodicity of a received signal. Flanagan discloses application of the cepstrum function to multipath signal suppression, in U.S. Pat. No. 3,662,108. The complex cepstrum of a received composite signal is formed, and the inverse Fourier transform of the real part of the cepstrum is computed. This inverse transform signal is clipped about a selected center to remove some distortion components, and the remaining "mountain top" signal has a sequence of maxima at time values corresponding to arrival of the desired signal and undesired multipath replicas at the receiver. A fast Fourier transform technique for computing cepstrum functions from received signals is disclosed by Dieterich et al in U.S. Pat. No. 5,065,242, for use in removing ghost images in received television signals.

Menard discloses a multipath time delay and correlation bandwidth analyzer system in U.S. Pat. No. 3,596,182. A correlation function is formed between a signal received at the receiver and a selected reference signal generated at the receiver. If the received signal contains strong multipath contributions, displaced in time from each other, the correlation function will contain two or more correlation pulses or maxima, also displaced in time. The reference signal can be a time delayed replica of the received signal.

U.S. Pat. No. 3,605,018, issued to Coviello, discloses a nonlinear signal processing system useful for suppressing strong multipath signals in a quaternary phase, spread spectrum communications system. A received composite signal, containing the desired signal and a superimposed strong multipath signal, is passed through a circuit containing a signal envelope detector and a signal averager, arranged in parallel. The envelope detector and signal averager output signals are applied to two terminals of a differential amplifier. The diff amp output signal is an estimate of the desired signal.

A system for quantitatively measuring multipath signal distortion is disclosed by Close in U.S. Pat. No. 3,869,673. A local oscillator, mixer and amplitude limiter are applied to a received signal to provide a first signal representing frequency variation and a second signal representing amplitude variation of the received signal. A correlation signal formed from the product of these first and second signals is a quantitative measure of multipath distortion present in the received signal.

Costas discloses apparatus for minimization of distortion in signals containing multipath signals and Doppler shift effects in U.S. Pat. No. 4,349,915. Signal arrival delay, such as produced by multipath signals, is determined by examining a selected frequency contribution of spaced apart pulses that arrive at the receiver.

Gutleber, in U.S. Pat. No. 4,457,007, discloses a multipath signal interference reduction system in which a plurality of replicas of the received signal, with different time delays, amplitudes and signal widths, are sequentially subtracted from the arriving composite signal (desired signal plus multipath signals) to produce a new composite signal with markedly reduced multipath signal contribution.

An adaptive multipath distortion equalizer, disclosed by Nossen in U.S. Pat. No. 4,669,091 uses simulation of the multipath distortion, based upon the composite signals received. After this multipath distortion signal is estimated, this distortion signal is subtracted from the composite signal received to produce an estimate of the desired signal. This approach uses time delay lines, amplitude scale factors and phase adjustments to obtain the estimated multipath distortion signal.

In U.S. Pat. No. 4,672,638, Taguchi et al disclose a multipath signal canceller that uses an envelope detector to determine the shape of a received composite pulse. This shape is compared with the shape of an undistorted pulse (earliest arriving pulse) stored in the receiver. The difference between these two shapes is used to construct a distortion-cancelling signal for signals that subsequently arrive at the receiver.

Rilling discloses a multipath signal reduction system, intended to compensate for multipath signals arriving from unknown directions, in U.S. Pat. No. 4,797,950. An adaptive array of spaced apart antennas is provided, with each antenna signal being processed identically by a band pass filter, a local oscillator, a signal mixer and a tapped time delay line. The processed signals are adaptively weighted by a feedback loop and added together to provide a signal with reduced multipath contributions. Any of eight classes of signal feedback equations can be used, depending upon the choice of form of an error term used for least squares minimization of a error signal. No reference signal is required for comparison in this system. An antenna pattern null is adaptively positioned in the (unknown) direction of the arriving, unwanted multipath signals.

Schilling, in U.S. Pat. No. 5,081,643, discloses multipath receiver apparatus that compares a time delayed replica of a transmitted with the received signal and chooses a signal propagation time delay that maximizes a correlation signal formed from the first two signals.

A method for multipath signal suppression in television receivers, disclosed by David Koo in U.S. Pat. No. 5,111,298, uses transmission of a test signal that is sampled and transformed to the frequency domain. Portions of the frequency spectrum are redistributed to other frequency ranges where the spectrum amplitude is nearly zero, and the redistributed spectrum is transformed back to the time domain to produce a processed signal where echo signal contributions are suppressed. Koo discloses another method for echo signal cancellation in television receivers in U.S. Pat. No. 5,121,211, again working with the frequency domain transform of a received test signal.

Chan et al, in U.S. Pat. No. 5,127,051, disclose an modem system that senses, and adaptively adjusts itself for, the presence of multipath signals in the transmission channel. A message is decomposed into a sequence of frames, each containing a first training packet, a data packet, and a second training packet. Each training packet contains a selected sequence of binary symbols and has a length that exceeds the expected temporal length of multipath dispersion in the channel. As each three-packet frame is received, the received first and second training packets are compared with the expected first and second training packets, symbol-by-symbol, to determine and compensate for the presence of any multipath dispersion in the channel.

In U.S. Pat. No. 5,142,551, Borth et al disclose a signal weighting equalizer for adaptively filtering multipath signals received by a single antenna. The system determines and assigns confidence levels on signal accuracy to different portions of a received signal and processes these portions according to the confidence levels assigned thereto. A received signal is passed through an equalizer, including a maximum likelihood sequence estimator, at the receiver to estimate the signal originally transmitted. A synthesized transmission channel generates and modifies a synthesized "re-transmitted" signal, based upon the equalized signal, that is compared with the signal actually received at the receiver to determine confidence levels for different portions of the received signal.

A multipath detector containing a differential amplifier that senses whether the signal strength is above a first level or is below a second (lower) level is disclosed by Nakamura et al in U.S. Pat. No. 5,159,708. If the signal strength is below the second level, the system concludes that a multipath signal is present. The signal threshold for presence of a multipath signal increases approximately linearly with an average electrical field strength of a received signal.

Cai et al disclose a digital signal equalization system that senses whether multipath dispersion is present in a received, data-modulated signal, in U.S. Pat. No. 5,164,959. A correlation signal is formed between the data-modulated signal and a similar, but non-data-modulated, signal generated at the receiver. If the correlation signal has two or more peaks, the system concludes that multipath dispersion is present and estimates the transmission channel impulse response. The system then determines a set of optimum weights for the direct and multipath signals to align these signals in phase and time to estimate the signal that would have been received through a non-dispersive channel.

Belcher et al, in U.S. Pat. No. 5,203,016, disclose a signal quality-dependent recursive integrator that compares the amplitude of an emphasized signal information component with a threshold amplitude to control gain in a feedback delay loop, for analyzing arriving signals containing multipath contributions. One or more time delayed versions of the received signal is recursively summed with the originally received signal, and the feedback loop gain varies inversely with the signal-to-noise ratio of the received signal.

Minamisono, in U.S. Pat. No. 5,218,359, discloses a post-processing adaptive antenna array system with independently controllable weights and phases assigned to each antenna. Correlation functions associated with different times and directions of signal arrival are computed. The antenna weights and phases are chosen to correspond to a direction of signal arrival that produces a cumulatively high received signal level, to suppress multipath signal interference.

In U.S. Pat. No. 5,241,317, issued to Howard, multipath signal reduction apparatus for radar signal analysis for range, altitude and elevation angle is disclosed. The apparatus receives sum and difference radar return signals from a target and logarithmically amplifies these signals. A largest peak amplitude signal is selected for each of the fading sum signals and the fading difference signals, and these selected signals are used to determine a ratio that is related to target elevation angle. This approach relies on identification of peak signal values and does not directly identify a multipath signal that may be present.

Ohsawa, in U.S. Pat. No. 5,303,264, discloses an adaptive equalizer for reducing signal distortion due to multipath interference and fading in a digital system. A "signal forget factor", dependent on the signal-to-noise ratio of an incoming signal, is applied to an automatic gain controller that receives the incoming signal. The equalizer varies the waveform with forget factor included, using a recursive least squares algorithm.

Several of these patents disclose examination of a correlation signal of, or form a related comparison of, an arriving signal with a selected reference signal generated at the receiver. These approaches usually require examination of a correlation signal for the presence of two or more local maxima or peaks, which are taken to indicate the presence of multipath signals. Here, however, interest centers on mitigating the presence of multipath signals that are delayed in time by less than the width of one digital symbol time, referred to as a chip width. These multipath signals do not necessarily manifest their presence by appearance of distinct correlation peaks or local maxima, but in other, more subtle ways. What is needed is an approach allowing more accurate estimation of the arrival time of the direct path signal by means of accurate quantitative evaluation of characteristics of the non-direct or multipath signals. Preferably, this approach should allow (near) real time identification and mitigation of the multipath signals so that the arrival time of the direct signal can be estimated with greatest accuracy.

SUMMARY OF THE INVENTION

The invention meets these needs by providing method and apparatus for using a plurality (preferably four or more) of correlators to identify detailed features of a correlation function at and adjacent to the correlation peak. In a first embodiment, the errors in location of the center point of a correlation function, formed by the received signal and a stored copy of the expected signal, are assumed to be strongly correlated for narrow sample spacing and wide sample spacing of the correlation function.

In a second embodiment, the multipath signal strengths and phases are estimated by a least mean squares analysis, using multiple sampling of a correlation function of an expected signal and an arriving composite signal that includes the direct signal and one or more multipath signals. This approach assumed that the times of arrival or path delays of the direct signal and the multipath signals are determined separately.

In one method of estimating these path delays, the invention forms an error function, which is a difference between correlation functions $R(\tau)$ of "early-arriving" $p(t+\tau_d)$ and "late-arriving" signals $p(t-\tau_d)$ with a reference signal $p(t)$, which may be a pseudo-random noise code signal, to determine whether multipath signals are present and to adaptively determine appropriate weighting to remove or suppress such signals. These two signals are combined to form a single, non-coherent correlation function (complex phase not present) $R(\tau_d)$ that achieves a local maximum for a particular time translation. The number of slope transition points that appear in the correlation function $R(\tau_d)$ for $\tau_d \neq 0$ indicates the number of strong multipath signals present and their times of arrival relative to the direct or line-of-sight signal. The apparatus determines times $\tau_d$ where this slope changes quickly or abruptly. A slope transition point occurs wherever this slope changes by more than a selected amount.

In another method of estimating these paths delays, a complex cepstrum function, discussed in the Noll et al and Flanagan patents, is used to estimate the strength and arrival time of any multipath signals present.

Once the full set of path delays $\{\tau_n\}_n$ is determined, determination of the complex gain parameters associated with the direct and multipath signals becomes a linear problem, if a least squares approach or similar method is used for such determination. Thus, use of the slope transition approach or of the cepstrum processing approach decomposes the problem of determination of the parameter sets $\{\tau_n\}_n$, $\{a_n\}_n$, and $\{\theta_n\}_n$ into two independent sub-problems, and the second of these sub-problems merely requires solution of an array of linear equations.

DESCRIPTION OF BEST MODE OF THE INVENTION

Figure 1:
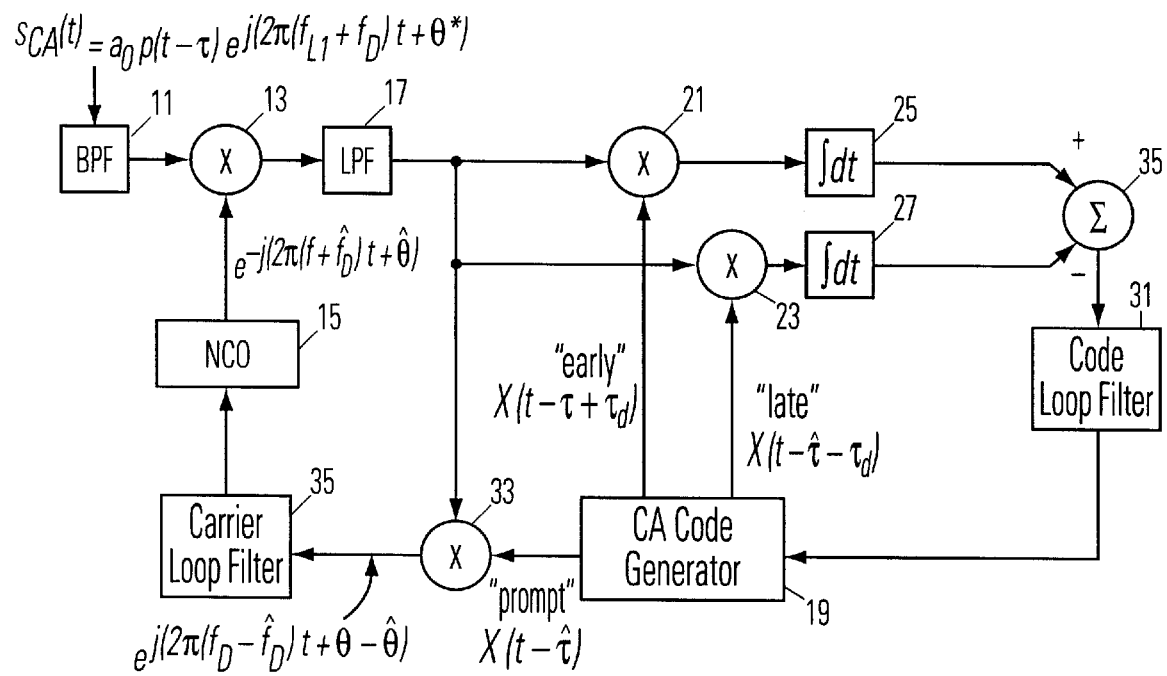
FIG. 1 is a schematic view of a prior art signal receiver used for analyzing multipath signals.

FIG. 1 illustrates a receiver used in the prior art. A received signal s(t) is represented by $$s(t) = s_0(t) + \sum_{m=1}^{N} s_m(t) = s_0(t) + S_M(t; N), \quad (1)$$

$$s_0(t) = a_0 p(t - \tau_0) \exp[j(\omega t + \theta_0)], \quad (2)$$

$$s_m(t) = a_m p(t - \tau_m) \exp[j(\omega t + \theta_m)] \quad (m = 1, \ldots, N), \quad (3)$$

where the first term $s_0(t)$ is the "direct" term and the sum $S_M(t;N)$ of the N additional terms $s_m(t)$ arises from N additional (multipath) signals ($N \geq 1$) that arrive at the receiver by other reflection and/or refraction. The parameters $a_m$, $\tau_m$ and $\theta_m$ ($m \geq 0$) represent the amplitude, time delay and phase, respectively, of the mth signal component and p(t) is a function of known shape. The received signal s(t) is passed through a bandpass filter (BPF) 11 (optional) and is converted to a baseband signal by multiplication at 13 of this signal by a local oscillator signal, represented by $\exp[-j(\omega t+\theta^*)]$ and produced by a local oscillator 15, and passage of the resulting signal through a low pass filter (LPF) 17, to produce a baseband signal $$s_{bb}(t) = \sum_{m=0}^{N} a_m p(t - \tau_m) \exp[j(\theta_m - \theta^*)]. \quad (4)$$

Here, $\theta^*$ is the receiver's estimate of the phase of the original signal s(t).

It is assumed herein that the transmitted signal is digital and has a known carrier signal that is a sinusoidal signal with a frequency $\omega$, modulated with a preselected binary signal p(t) with a prescribed chip frequency $f_c$. The selected binary signal may be, but need not be, a pseudo-random noise signal, for example, as used in a global positioning system or global navigation system, such as GPS or GLONASS.

Typically, a receiver will form a correlation function of the baseband signal $s_{bb}(t)$ with two or three copies of the expected signal $p(t-\theta_0)$, suitably time shifted. If the local oscillator signal multiplication, low pass filtering and correlation functions are combined, the result is two or more correlation functions of the form $$x_j(\tau^*, \tau_d) = \int_0^T s_{bb}(t)p(t - \tau^* - (-1)^j \tau_d/2) dt/T \ (j = 1, 2) \quad (5)$$

$$= R(\tau^* + (-1)^j \tau_d/2),$$

$$R(\tau) = \int_0^T s_{bb}(t)p(t - \tau) dt/T, \quad (6)$$

where $\tau^*$ is the present estimate of the signal arrival time and $\tau_d$ is the separation time for two samples centered at the time $\tau^*$, and T is the integration time for the integration modules 25 and 27. The separation time $\tau_d$ is between 0.05 $T_c$ and 0.2 $T_c$, and 0.5 $T_c$ and $T_c$, for narrow correlator spacing and wide correlator spacing, respectively, where $T_c=1/f_c$ is the length of the time interval of one pulse, or "chip width". If the estimated arrival time $\tau^*$ is within a time interval of length $\tau_d/2$ of the true arrival time $\tau$, the early signal $x_1$ and the late signal $x_2$ "straddle" the true signal arrival time $\tau$, whose value is not yet known. The early and late code functions $p[t-\tau^*\pm\tau_d/2]$ are stored and/or generated by a code generator 19, and the early and late code functions are multiplied by the baseband signal $s_{bb}(t)$ in two signal multipliers 21 and 23, respectively. The product signals produced by the multipliers 21 and 23 are passed to integrator modules 25 and 27, where the input signals are integrated over a time interval [0,T] to form the correlation signals $x_1(\tau^*,\tau_d)$ and $x_2(\tau^*,\tau_d)$. The difference of these two correlation signals is formed in a difference module 29, and the difference signal is passed to a code loop filter 31 that determines appropriate values of the variable $\tau^*$ that "steer" the quantity $x_1(\tau^*,\tau_d)-x_2(\tau^*,\tau_d)$ toward 0. The output signals ($\tau_d$ and $\tau^*$) from the code loop filter 31 are passed to the code generator module 19, which uses these input values to form the code functions $p(t-\tau^*\pm\tau_d/2)$.

The code generator 19 also produces a "prompt" signal $p(t-\tau^*)$, which is multiplied in a multiplier module 33 by the original baseband signal $s_{bb}(t)$ and passed to a carrier loop filter 35 that develops an error signal. This error signal steers the frequency and phase of the local carrier oscillator. The output signal of the carrier loop filter 35 is received by the local oscillator 15 and controls the choice of LO frequency and/or LO phase $\theta^*$. The carrier feedback loop shown in FIG. 1 seeks to drive the imaginary part of the output signal of the carrier loop filter 35 to zero.

Figure 2:
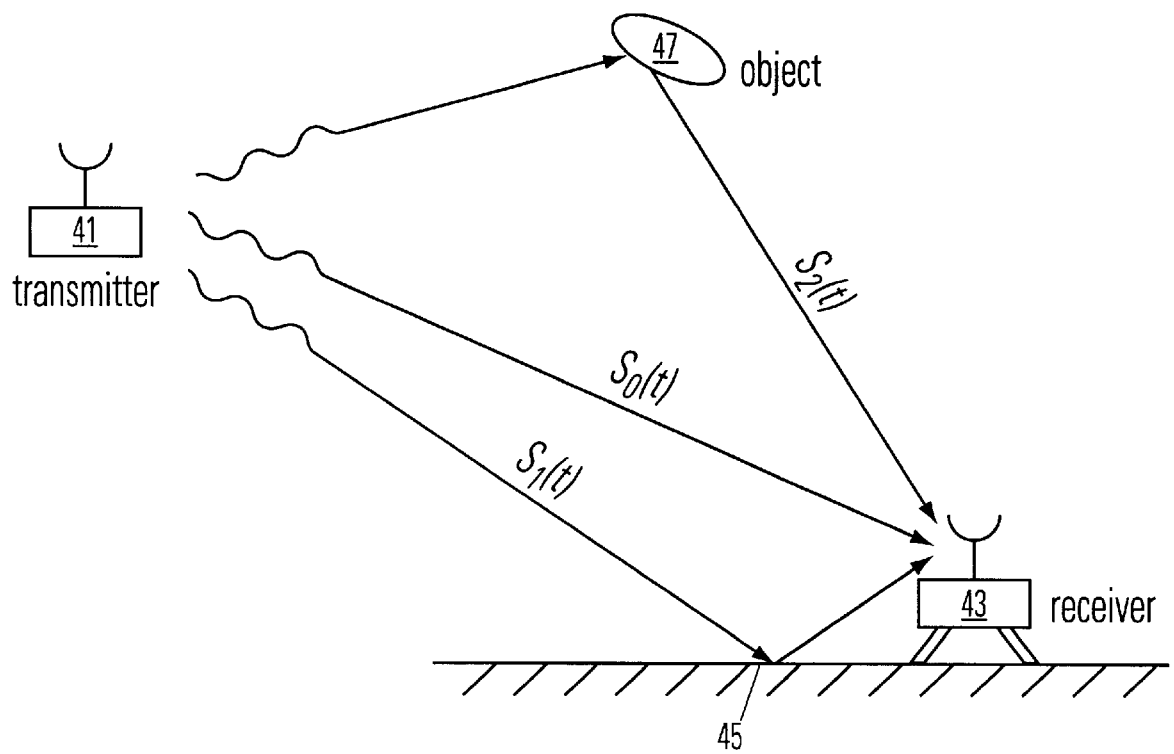
FIG. 2 is a schematic view of receiver apparatus operated in the presence of multipath signals.

In FIG. 2, a signal $p(t)\exp[j(\omega t+\theta_0)]$ transmitted by a transmitter 41 is received by a receiver 43 as the sum of (1) a "direct" signal $s_0(t)=a_0\ p(t-\tau_0)\exp[j(\omega t+\theta_0)]$ plus (2) one or more possibly distorted replicas $s_n(t)$, called multipath signals, of the direct signal at times $t=t_m\neq\tau_0$ (m=1, 2, ..., N), represented as a sum $s(t)=s_0(t)+S_M(t;N)$. One multipath signal component $s_1(t)$ may have been reflected from a ground plane 45 before that component arrives at the receiver 43. A second multipath signal component $s_2(t)$ may have been reflected by an object 47 spaced apart from the Earth before being received at the receiver 43.

If only additive white Gaussian noise is assumed to be present, the variance of the estimated time delay error $\tau-\tau^*$ is found to be $$\sigma^2(\tau^*)=E[(\tau-\tau^*)^2]=T_c\tau_d B_N/(C_p/N_0) \text{ (in sec}^2), \quad (7)$$

where $B_N$ is the noise bandwidth of the closed code phase loop, and $C_p/N_0$ is the ratio of carrier power to the noise spectral power density. Equation (7) indicates that, all other things being equal, a receiver with narrow correlator spacing $\tau_d$ will provide smaller variance and thus better performance, than a receiver with large correlator spacing.

A choice of narrow correlator sample spacing $\tau_d<<T_c$ is also sometimes appropriate in a multipath signal environment, because the error in estimation of arrival time $\tau$ generally grows with the correlator spacing $\tau_d$. Although narrow correlator sample spacing generally reduces the mean squared error for the estimated arrival time t, certain demanding applications require even smaller errors. Further, if the narrow correlator sample spacing is too small, where a correlation function has more than one local maximum or peak, the receiver can "lock" to the wrong peak by receiving correlation information only for very small spacings.

The invention uses four or more correlator sample values, or correlations, to obtain better performance where multipath signals are present. The invention relies upon one or more of four approaches: (1) the correlation function is sampled using narrow sample spacing ($\tau_d\approx 0.05\ T_c$ to 0.2 $T_c$) and using wide sample spacing ($\tau_d\approx 0.5\ T_c$ to $T_c$), with the additional data from the wide sample spacing being used to correct errors introduced by using only narrow sample spacing in a multipath environment; (2) least squares estimation of multipath signal strengths, wherein the correlation function is multiply sampled (typically 10–30 times) and an algorithm provides an estimate of the multipath signal strengths, by minimizing the sum of certain square error residuals; (3) least squares estimation of multipath signal strength parameters, where path delays are identified by time where the slope of a correlation function changes abruptly and substantially; and (4) least squares estimation of multipath signal strength parameters, where path delays are identified using cepstrum signal processing of the received signal s(t), manipulating the logarithm of the Fourier transform of s(t), followed by an inverse Fourier transformation; the multipath manifests its presence by a sequence of pulses, each corresponding to arrival of a distinct direct or multipath signal in this algorithm.

Figure 3:
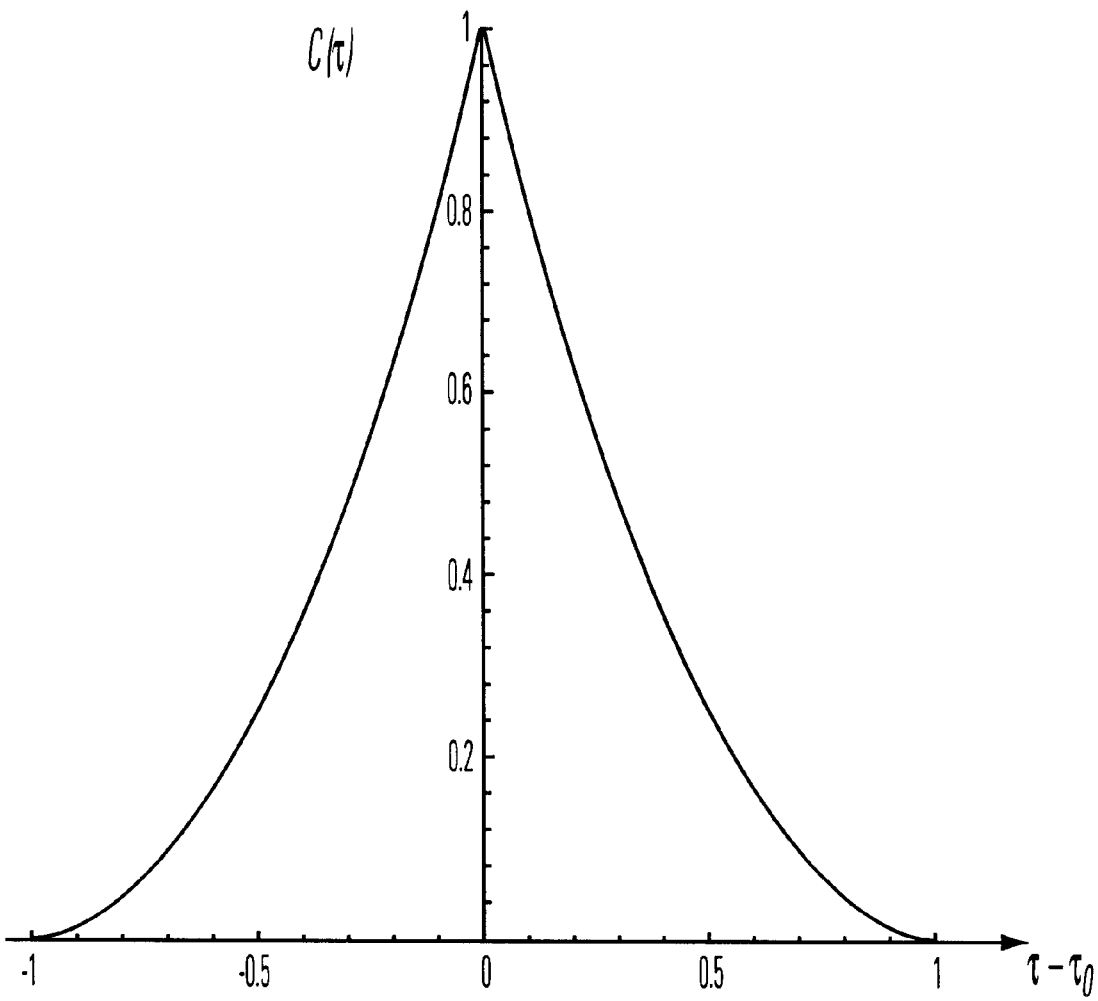
FIG. 3 is a graphical view of a correlation signal formed from receipt of a direct signal only.

FIG. 3 illustrates a correlation function magnitude $|R(\tau)|$, where $R(\tau)$ is defined by Eq. (6) and the baseband signal $s_{bb}(t)$ is defined in Eq. (4). In FIG. 3, no multipath signals are present ($S_M(t;N)=0$ in Eq. (1)). The correlation function magnitude $|R(\tau)|$ is approximately symmetric, reaches a single maximum value at $\tau=\tau_0$ and decreases smoothly and strictly monotonically to zero as $\tau-\tau_0\pm T_c$, where $f_c=1T_c$, where $T_c$ is the chip width and $f_c$ is the chipping rate.

Figure 4:
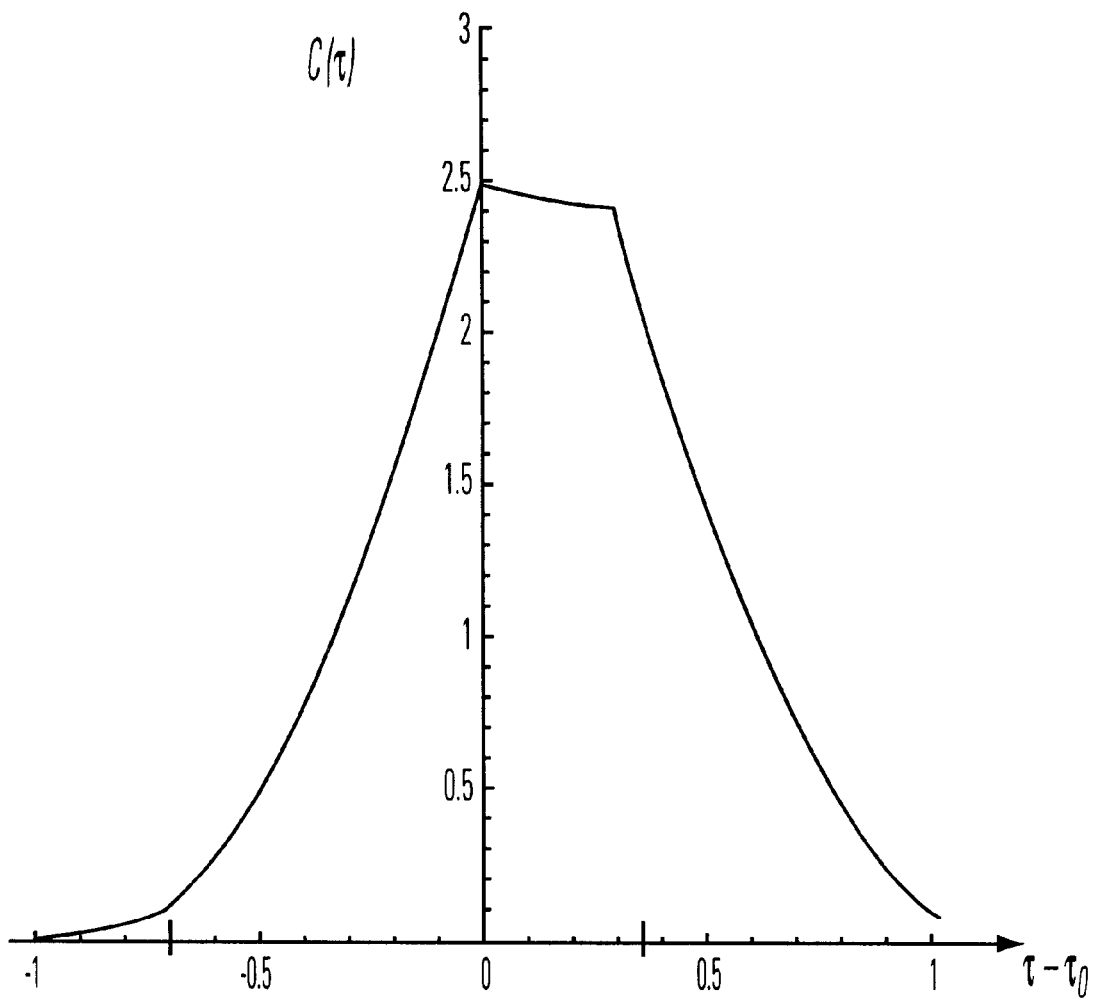
FIG. 4 is a graphical view of a correlation signal that might be formed from receipt of a composite signal, including multipath signal(s).

FIG. 4 illustrates a representative correlation function $R(\tau)$ that might be generated for the total signal s(t) of Eq. (1), with direct and multipath signals present. Here, the correlation function has a maximum at $\tau=\tau_0$ as before and manifests a significant change in slope at $\tau=\tau_0$, $\tau=\tau_0-0.7\ T_c$ and at $\tau=\tau_0+0.35\ T_c$, and the slopes of the correlation function $R(\tau)$ for $\tau<\tau_0$ and for $\tau>\tau_0$ differ substantially from each other. At each time point $\tau=\tau_0+t_s$ in the domain of the correlation function, the slope changes abruptly. Each slope transition point $\tau=\tau_0+t_s$ potentially corresponds to a time of arrival $\tau=\tau_0+t_s$ of a distinct multipath contribution to the signal $S_M(t;N)$ in Eqs. (1)–(3). By determining the time value of each slope transition point $\tau-\tau_0=t_s$, one may identify the corresponding slope transition times $\tau_n=\tau_0+t_s$ and the integer N to be used to construct an approximation for the function $s_{bb}(t)$ in Eq. (4) representing the baseband signal that arrives at the receiver 43 in FIG. 2. This analysis is discussed below.

Figure 5:
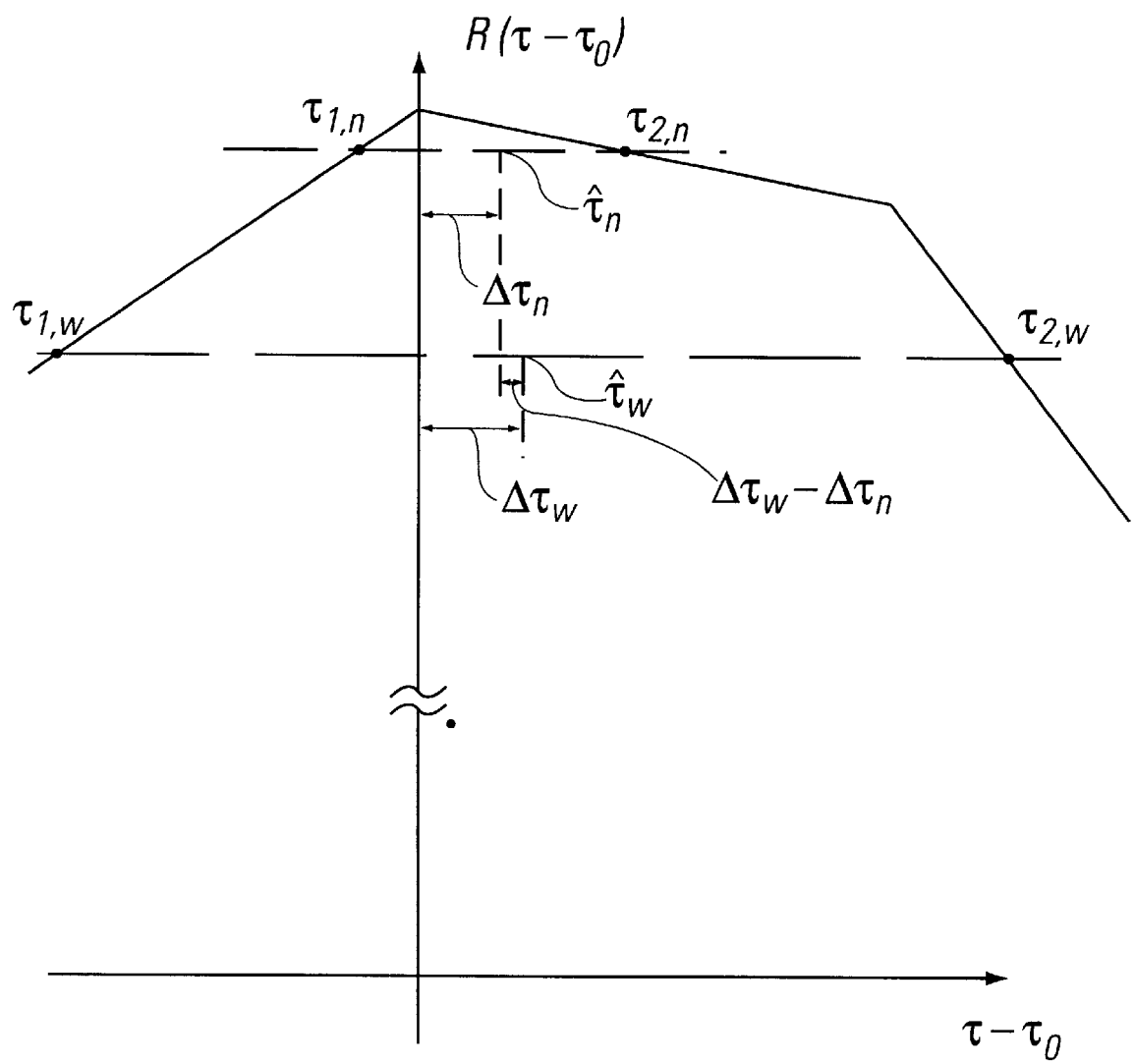
FIG. 5 is a graphical view of a correlation function in the presence of one or more multipath signals, indicating the center point error that occurs with use of narrow spaced and wide spaced correlator samples.

FIG. 5 exhibits another representative correlation function $R(\tau)$ that might appear if multipath signals are present. FIG. 5 illustrates the results of: (1) wide correlator function sampling, with corresponding sampling points $\tau=\tau_{1w}$ and $\tau=\tau_{2w}$, a midpoint $\tau=\tau_{w,avg}=(\tau_{1w}+\tau_{2w})/2$, and an associated midpoint error $\Delta\tau_w=\tau_w-\tau_0$; (2) narrow correlator function sampling, with corresponding sampling points $\tau=\tau_{1n}$ and $\tau=\tau_{2n}$, a midpoint $\tau=\tau_{n,avg}=(\tau_{1n}+\tau_{2n})/2$, and an associated midpoint error $\Delta\tau_n=\tau_n-\tau_0$; and (3) a midpoint error difference $\Delta\tau_w-\Delta\tau_n=\Delta\tau_{w,avg}-\Delta\tau_{n,avg}$ between the wide and narrow correlator function sampling values.

For relatively narrow correlation sample spacing (e.g., $\tau_{2n}-\tau_{1n}=\tau_d\approx T_c/20$) in FIG. 5, the estimated narrow sample spacing midpoint $\tau_n$ for this spacing is determined by requiring that the early and late correlator function amplitudes (or their absolute values) be equal, $$R(\tau_{1n})=R(\tau_{2n}), \quad (8)$$

for the particular choices $\tau_{1n}$ and $\tau_{2n}$ made. The midpoint error $\Delta\tau_n$ is relatively small. For relatively wide correlation sample spacing (e.g., $\tau_{2w}-\tau_{1w}=\tau_d\approx T_c/2$) in FIG. 5, the early and late sample point amplitudes $R(\tau_{1w})$ and $R(\tau_{2w})$ are again required to be equal. The estimated wide sample spacing midpoint $\tau=\tau_w$ is displaced from the true center point $\tau=\tau_0$ by a larger amount $\Delta\tau_w=\tau_w-\tau_0$. However, as demonstrated later, the "wide" samples contain information that can be used to further reduce the error suffered by the "narrow" samples.

Figure 6:
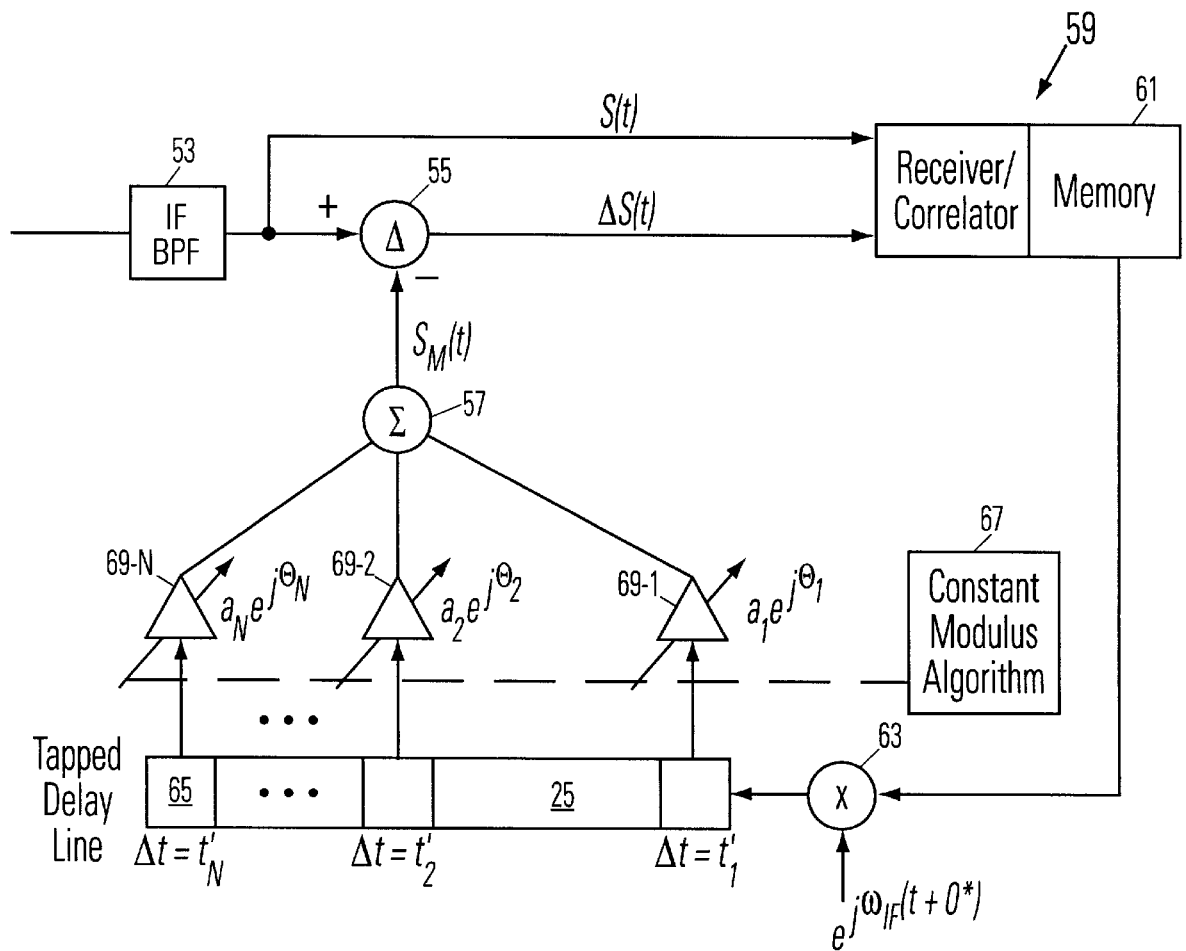
FIG. 6 illustrates a prior art receiver.

A multipath noise canceller 51, well known to those skilled in the art, is illustrated in one form in FIG. 6. The canceller 51 attempts to replicate the total multipath signal component $S_M(t;N)$, for subsequent subtraction from the total signal s(t). The input signal s(t) is passed through a BPF 53, and the filtered input signal $s_f(t)$ is received by a first input terminal of a difference module 55. A second input terminal of the difference module 55 receives a sum signal $s_{sum}(t)$ formed by a sum module 57, whose operation is described below. The output signal $\Delta s(t)=s_f(t)-s_{sum}(t)\approx s_0(t)$ (the direct signal) is passed to a first input terminal of a correlator module 59 that includes a memory unit 61. The filtered signal $s_f(t)$ is received at a second input terminal of the correlator module 59. The memory unit 61 contains a known shape function p(t) that characterizes the signal transmitted by the transmitter 11 in FIG. 2, which is provided as a first input signal to a multiplier module 63, whose second input signal is a local oscillator signal $\exp[-j(\omega_{IF}t+\theta^*)]$, where the intermediate frequency $\omega_{IF}$ and the phase angle $\theta$ are selected from other considerations.

The output signal from the multiplier module 63 is of the form $p(t)\exp[-j(\omega_{IF}t+\theta^*)]$, and this output signal is transmitted along a tapped time delay line 65 having N time delay taps (N≧1) corresponding to time delays $\tau 1, \tau 2, \ldots, \tau N$, where these individual time delays are fixed or chosen by an algorithm module 67 that receives an input signal from the correlator module 59. At a given time delay tap (n), the output signal is $p(t-\tau_m)\exp[-j(\omega(t-\tau_m)+\theta)]$, and this output signal is multiplied in a multiplication module 69-m by a complex number $a_m \exp(j\theta_m)$ (complex path gain for tap m). The numbers $a_m$ and $\theta_m$ are selected by the algorithm module 67. A sum signal $$s_{sum}(t) = \sum_{m=1}^{N} a_m p(t-\tau_m)\exp[-j(\omega(t-\tau_m)+\theta-\theta_m)] \quad (9)$$

is formed by the sum module 57 and is provided at the second input terminal of the difference module 55, as noted before. The algorithm module 67 selects the parameters $a_m$, $\theta_m$ and $\tau_m$ for the tapped delay line 65 and the multiplication modules 69-m according to any of a plurality of selected algorithms described below. The tap weighting coefficients $a_m \exp(j\theta_m)$ are adjusted so that $s_{sum}(t)$ resembles the total multipath signal as closely as possible, based upon a criterion associated with the algorithm chosen.

Figure 7:
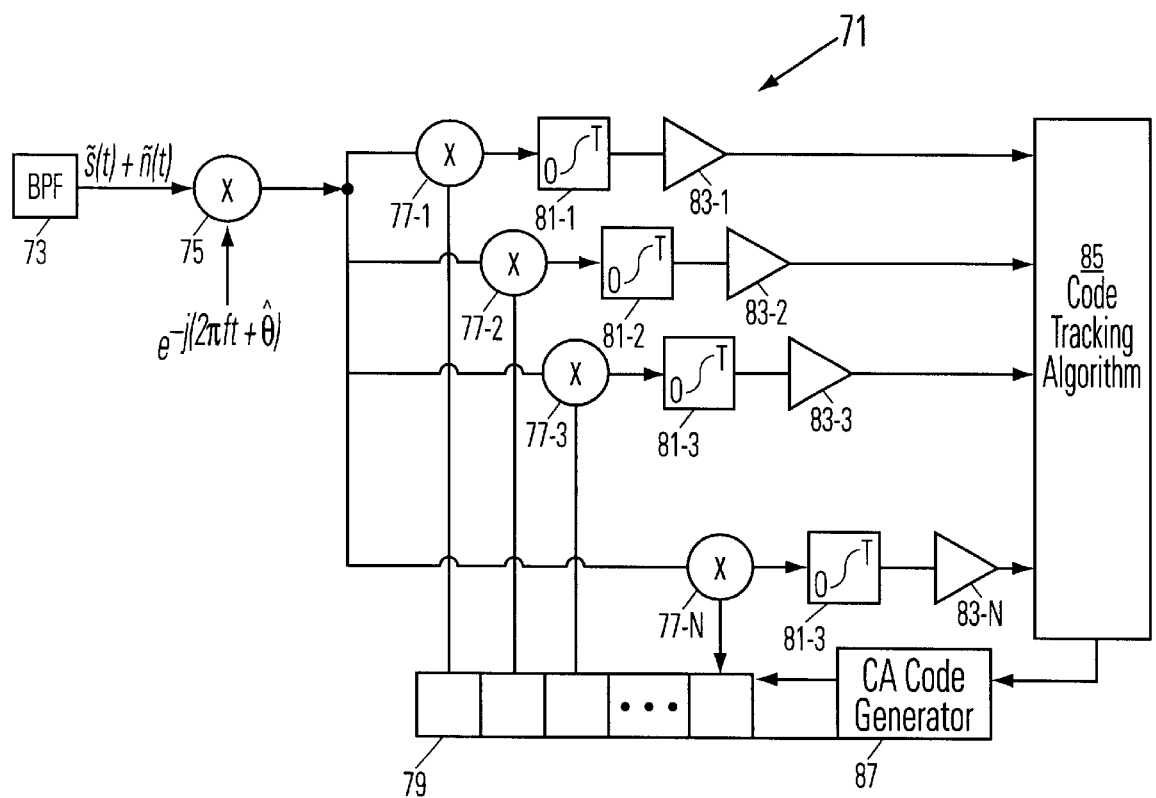
FIG. 7 illustrates an embodiments of a receiver constructed according to the invention.

One embodiment 71 of the invention is illustrated in FIG. 7. An incoming signal s(t) in Eq. (1) is passed through a BPF 73 (optional) and through an LPF or BPF 74 (optional), and the resulting baseband signal $s_{bb}(t)$ is received by the first input terminals of each of a sequence of signal multipliers 77-m (m=1, 2, ..., N; N≧2). The second input terminals of the signal multiplier 77-m receives a time-delayed signal $p(t-\tau_m)$ from a tapped signal delay line 79, which is described below. The individual product signals $s_{bb}(t)p(t-\tau_m)$ are received by a sequence of signal integrators 81-m and integrated with respect to time over a selected time interval [0, T]. The integrated signals are passed through signal amplifiers 83-m (optional) and are received by N input terminals of a code tracking module 85 that selects a tap weighting coefficient $a_m \exp(j\theta_m)$ and multiplies this coefficient by the input signal $s_{bb}(t)p(t-\tau_m)$ received at the mth input terminal. These product signals are processed by the code tracking module 85 as illustrated in the four preferred embodiments discussed below. The code tracking module 85 controls a code generator module 87 that issues the replica signal p(t). The replica signal p(t) is then passed to the tapped time delay line 79, which forms a sequence of time delayed copies $p(t-\tau_m)$ of the input signal and issues these time delayed signals for use in the signal multipliers 77-m as shown. The code tracking module 85 and code generator module 87 rely on algorithms described below.

Figure 8A:
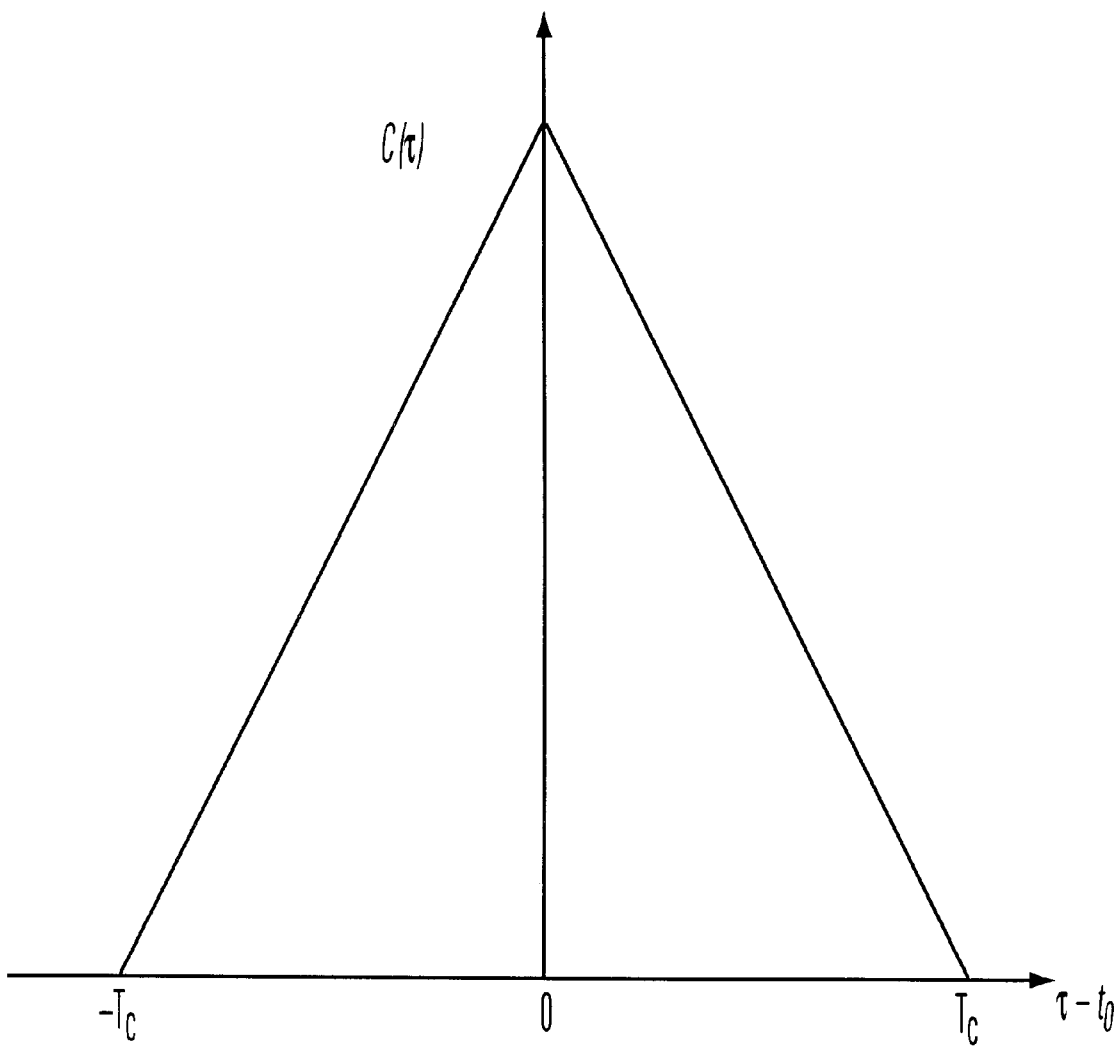
FIGS. 8A, 9A and 10A are graphical views of correlation signals formed from receipt of three different composite signals.
Figure 9A:
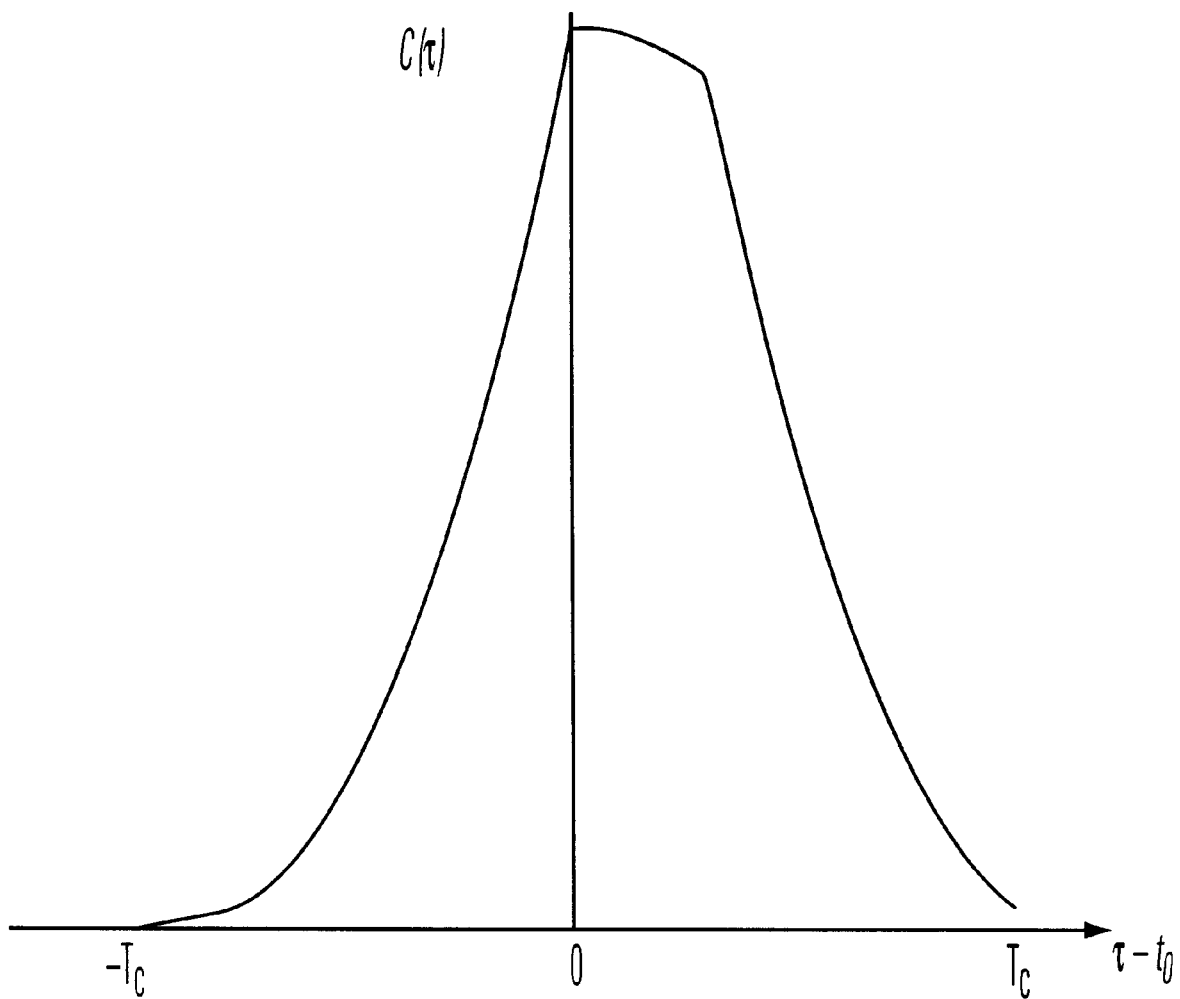
Figure 9B:
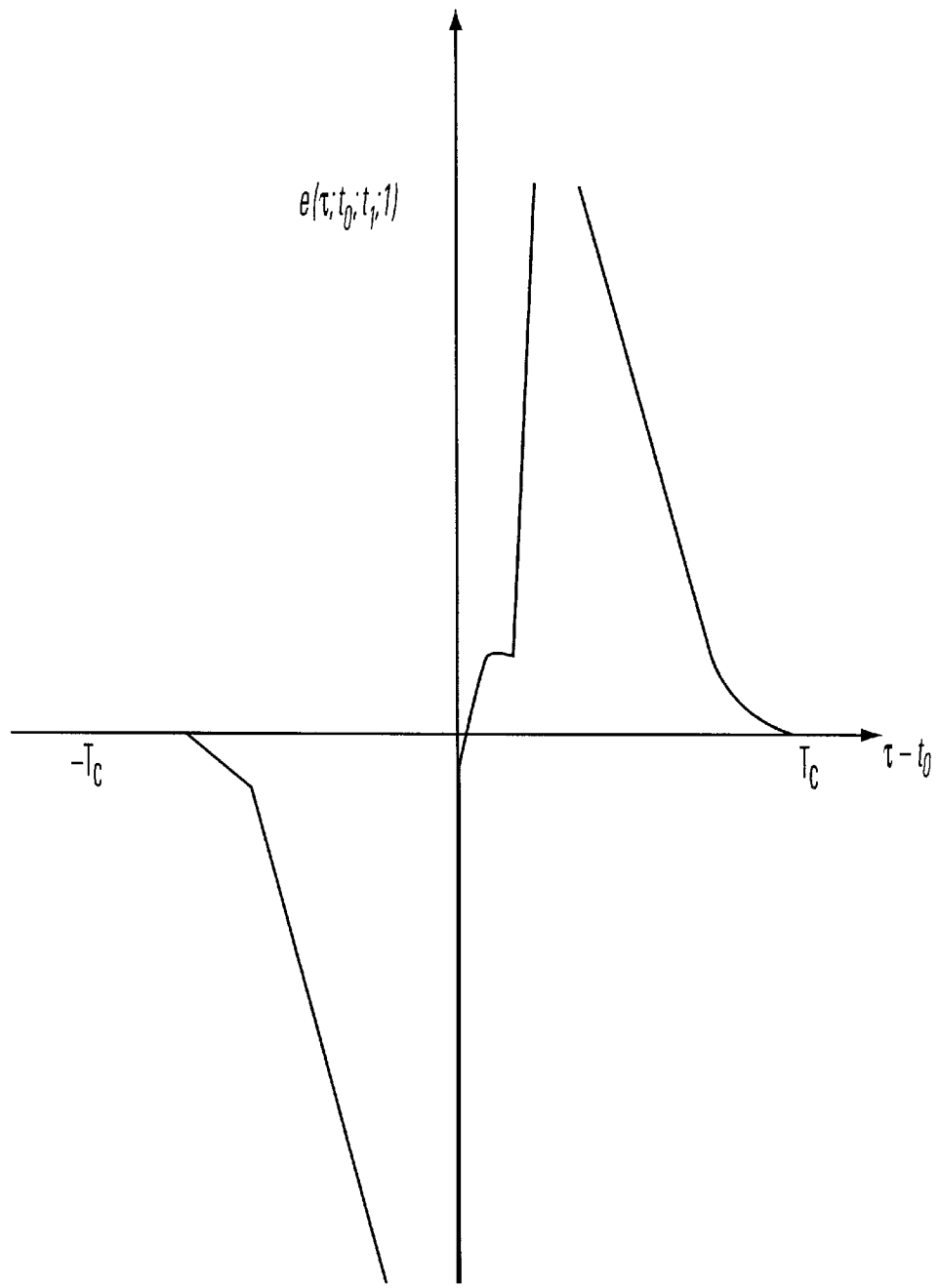
Figure 10A:
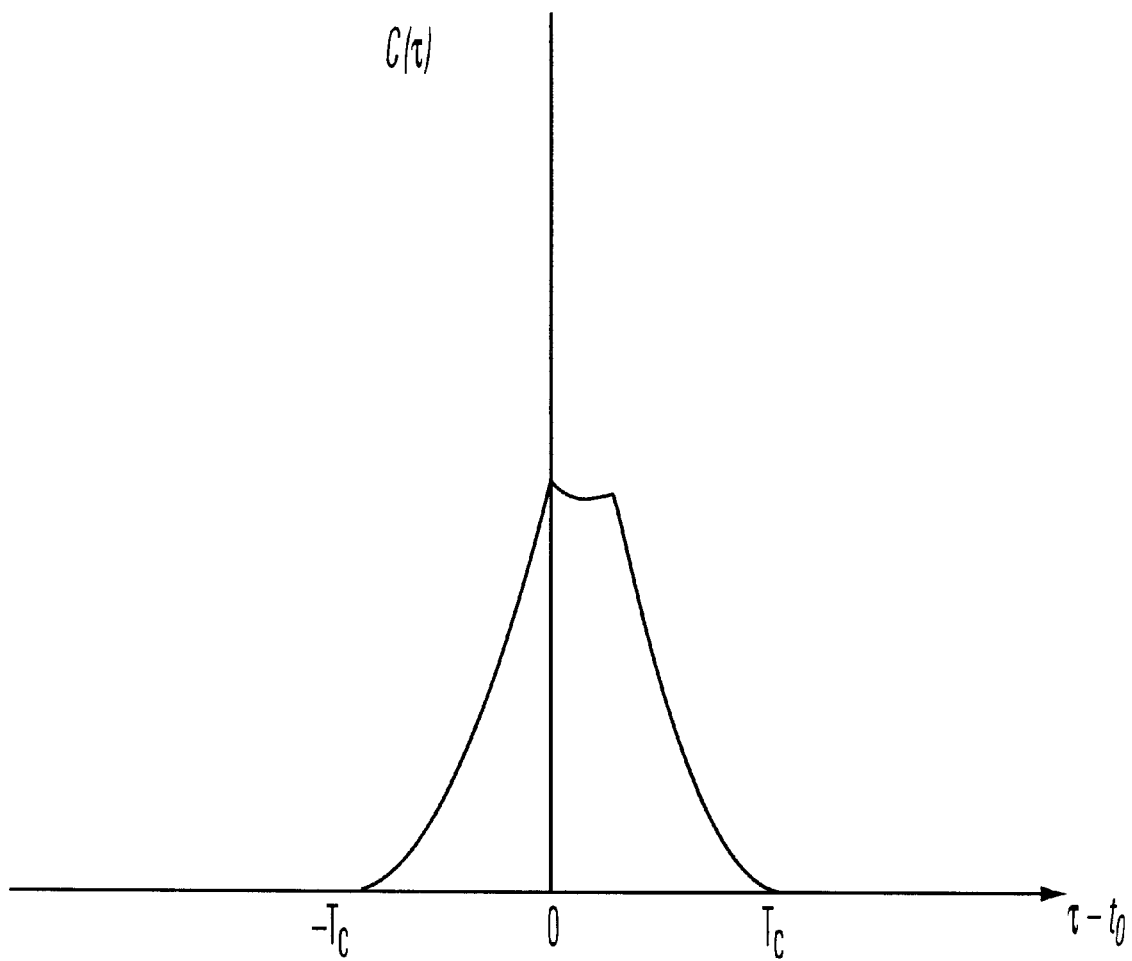
Figure 10B:
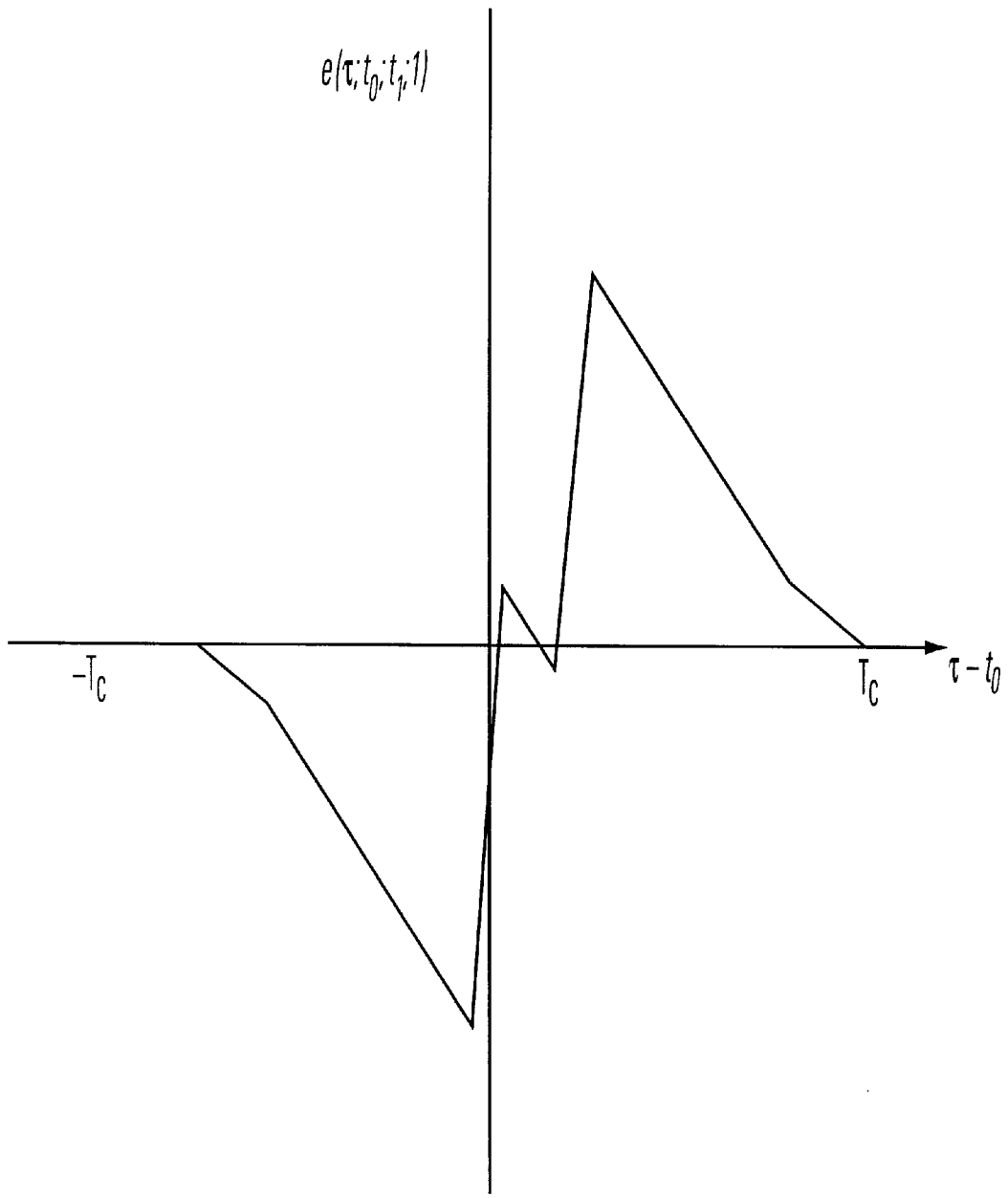

FIGS. 8A, 8B, 9A, 9B, 10A and 10B concern an error function $e(\tau;\tau_0;\tau_d;r)$ defined by $$e(\tau-\tau_0;\tau_d;r)=|R(\tau-\tau_0-\tau_d)|^r-|R(\tau-\tau_0+\tau_d)|^r, \quad (10)$$

where $\tau_d$ is a time value that ranges over the correlator spacing ($0\leq\tau_d\leq T_c$) and r is a selected positive number (e.g., r=0.5, 1.0, 1.5, 2.0, $\sqrt{\pi}$, or any other rational or irrational number). FIGS. 8A, 9A and 10A illustrate three representative shapes for the correlation function $R(\tau-\tau_0)$, and FIGS. 8B, 9B and 10B illustrate the corresponding correlation error functions $e(\tau-\tau_0;\tau_d;r)$ with the choice r=1.

If the time of arrival $\tau_0$ is not initially known, this quantity may be determined by designating $\tau_0$ to be the time value (by interpolation or otherwise) at which the error function $e(\tau-\tau_0;\tau_d;r)$ changes sign. It is possible, although unlikely, that two or more distinct time values exist at which the error function $e(\tau-\tau_0;\tau_d;r)$ changes sign.

Figure 8B:
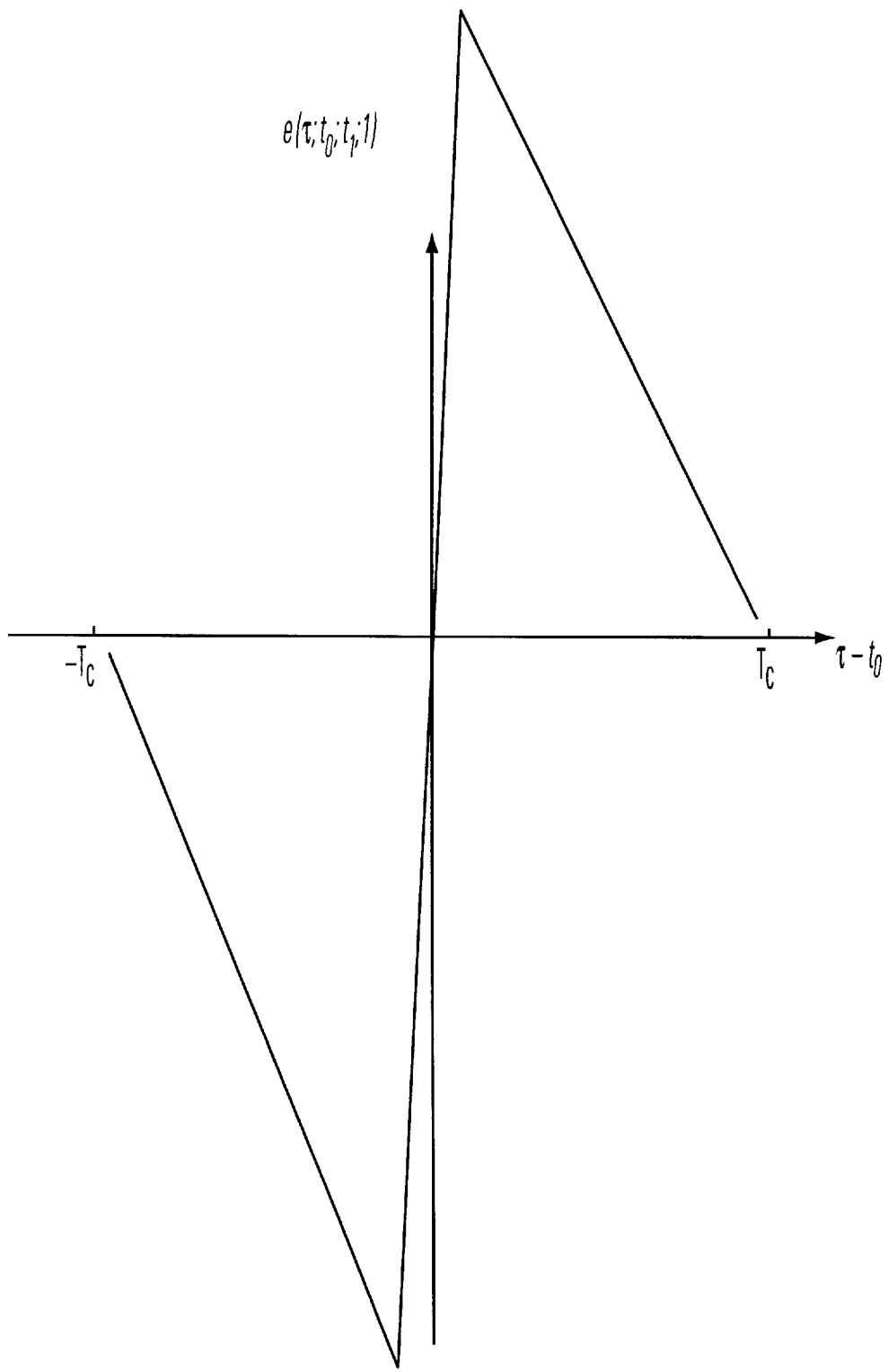
FIGS. 8B, 9B and 10B are graphical views of error signals formed from these respective correlation signals, according to one embodiment of the invention.

If the correlation function $R(\tau)$ is nearly symmetric around a time value $\tau_0$, the error function $e(\tau-\tau_0;\tau_d;r)$ will resemble the function shown in FIG. 8B for all time values $\tau-\tau_0$ in the domain of the error function. This condition may be taken to indicate that no multipath signals are present or that the multipath signals are severely attenuated when they arrive at the embodiment 71 in FIG. 7.

I. A first approach that may be used by the algorithm modules 67 and 85 in FIGS. 6 and 7 relies upon a combination of narrow and wide sample spacing of the correlation function. A first pair of samples has narrow sample spacing, typically $\tau_d$ between 0.01 $T_c$ and 0.2 $T_c$, and the second pair of samples has wide sample spacing, typically $\tau_d$ between 0.4 $T_c$ and $T_c$. The receiver estimates the time delay of the signal s(t) using the first pair of correlation signal samples, and the second pair of samples is used to correct the errors introduced by the presence of multipath signals.

Figure 11:
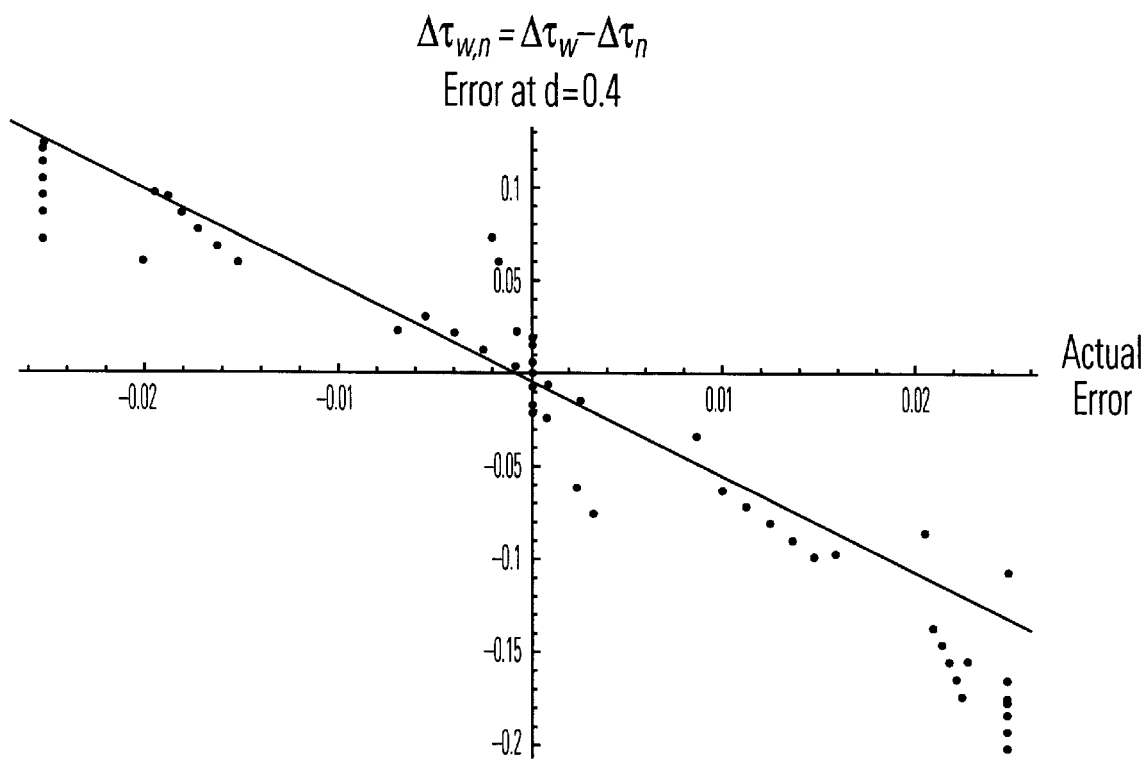
FIGS. 11 and 12 are graphical views of errors illustrate results of simulation of multipath signal-induced errors in center point position.
Figure 12:
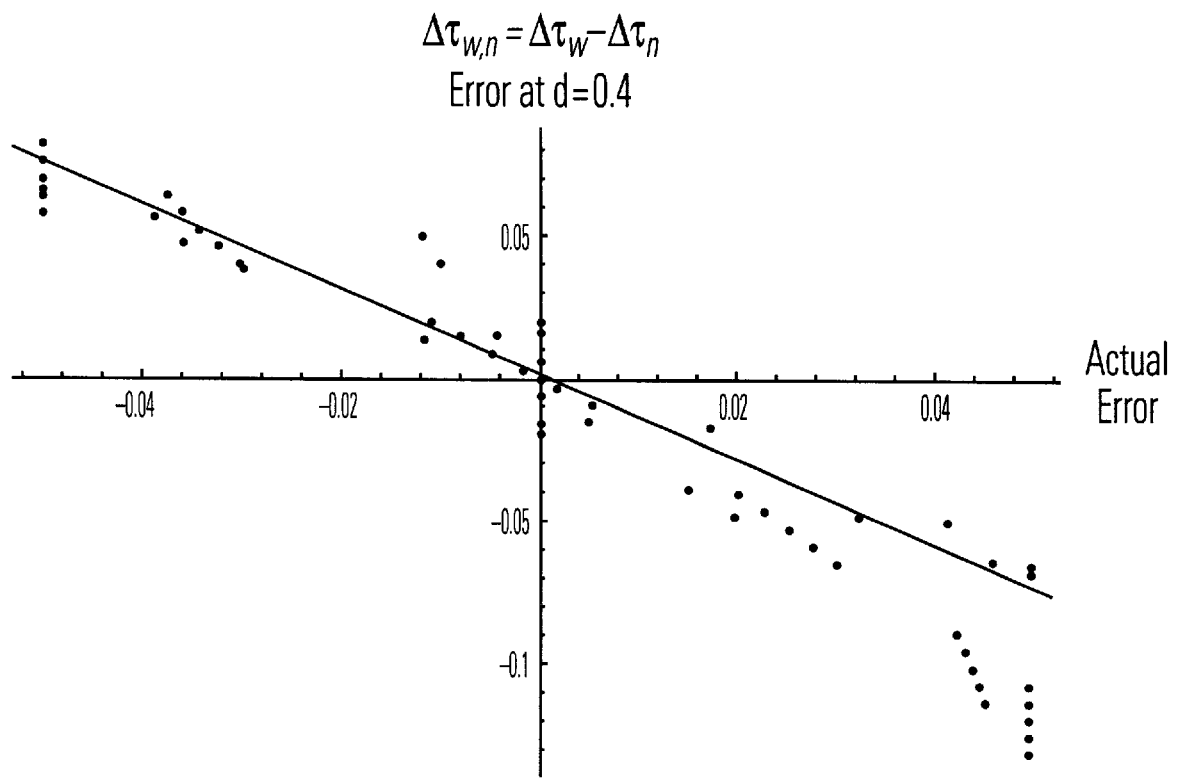

FIGS. 11 and 12 exhibit results from a simulation of multipath signal errors in a representative receiver, such as a global positioning system receiver, wherein the abscissa represents the actual signal error experienced by a receiver that uses correlation function sample spacing $\tau_d=0.1T_c$ and $\tau_d=0.2T_c$, respectively. The ordinate for each figure represents the measurable midpoint error difference $\Delta\tau_{w,n}=\Delta\tau_w-$ $\Delta\tau_n$, where the wide sample spacing for each of these figures satisfies $\tau_d=0.4T_c$. The abscissa for each of these Figures represents the midpoint error $\Delta\tau_n$ with a narrow sample spacing ($\tau_d=0.1T_c$ in FIG. 11, $\tau_d=0.2T_c$ in FIG. 12) resulting from the simulation. Otherwise stated, the errors shown on the ordinates in FIGS. 11 and 12 are measured by the wide correlator when the receiver is locked to the narrow correlator. FIGS. 11 and 12 indicate that measurable midpoint error differences $\Delta\tau_{w,n}$ are strongly correlated with the errors $\Delta\tau_n$ produced by the correlator using narrow sample spacing.

Least pth power analysis (e.g., p=2) can used here to determine a line L of the form y=a x+b (y=$\Delta\tau_n$, x=$\Delta\tau_w-\Delta\tau_n$) for each of FIGS. 11 and 12 that most closely fits the simulation data on each of these figures. This analysis minimizes the sum $$\varepsilon_p(a,b) = \sum_i |ax_i + b - y_i|^p, \tag{11}$$

with respect to choices of the parameters a and b, for a selected number p>0. Here, $(x_i, y_i)$ is one of the simulation data coordinate pairs in FIG. 11 or 12. The choice p=2 reproduces the well known least mean squares analysis, with well known expressions for the parameters a and b. Alternatively, any other suitable optimization procedure can be used here, with a different choice of p. A particular best fit to the simulation data shown in FIGS. 11 and 12, is represented by a line L of the form $$\Delta\tau_n = a(\Delta\tau_w - \Delta\tau_n) + b, \tag{12}$$

where $\Delta\tau_n$ and $\Delta\tau_w-\Delta\tau_n$ are the variables associated with the abscissa and ordinate values, respectively, for the line L obtained from FIG. 11 or 12. The correlation parameters a and b for the data illustrated in FIGS. 11 and 12 and the choice p=2 have the approximate values a($\tau_d$=0.1, 0.4)=−0.1901, b($\tau_d$=0.1, 0.4)=0, a($\tau_d$=0.2, 0.4)=−0.6803 and b($\tau_d$=0.2, 0.4) ≈0, indicating a strong correlation between the correlation function midpoint errors with the measurable quantity $\Delta\tau_w-\Delta\tau_n$ in each instance. For each different pair of choices for narrow spacing and wide spacing, a new optimal parameter pair (a,b) will be found. For the first algorithm used in the invention, the relationship of Eq. (12) is used as indicated below to reduce the error in time of arrival of the direct signal and to thereby reduce the multipath signal error in the composite signal.

Let ($\Delta\tau_n$, $\Delta\tau_w-\Delta\tau_n$) be a coordinate pair of error values shown in FIGS. 11 and 12 for the narrow and wide spacing samples of the correlation function R($\tau$). With reference to FIG. 5, $\Delta\tau_n$ and $\Delta\tau_w$ are the differences between the "true" position $\tau=\tau_{peak}$ of the correlation function peak and the estimated peak positions, obtained by using the respective estimates $$\tau_{n,avg} = (\tau_{1,n} + \tau_{2,n})/2, \tag{13}$$

$$\tau_{w,avg} = (\tau_{1,w} + \tau_{2,w})/2; \tag{14}$$

that is, $$\Delta\tau_n = \tau_{peak} - \tau_{n,avg}, \tag{15}$$

$$\Delta\tau_w = \tau_{peak} - \tau_{w,avg}. \tag{16}$$

It is assumed here that a representative signal receiver has been tested sufficiently to obtain a collection of measured error value pairs $(x_i, y_i)=(\Delta\tau_{n,i}, \Delta\tau_{w,i}-\Delta\tau_{n,i})$ as shown in FIGS. 11 and 12, for a selected choice of narrow correlation sample spacing $\tau_n$ and wide correlation sample spacing $\tau_w$ and that the optimal parameters a and b for Eq. (11) or Eq. (12) have been determined.

In a particular situation, it is impossible to obtain either of the error values $\Delta\tau_n$ or $\Delta\tau_w$ because the location $\tau=\tau_{peak}$ is not known. However, the difference $\Delta\tau_w-\Delta\tau_n$ can be measured and Eq. (12) can be used to estimate the error associated with by the narrow correlator midpoint value. Ideally, the relation $$\tau_n - \tau_{peak} - a(\Delta\tau_w - \Delta\tau_n) - b = 0 \tag{17}$$

should be true, where the parameters a and b are determined from simulations such as those shown in FIGS. 11 and 12. Equation (17) can then be rearranged to provide an improved estimate for the unknown variable $\tau_{peak}$, namely $$\tau_{peak}' = \tau_n - a(\Delta\tau_w - \Delta\tau_n) - b = 0. \tag{18}$$

With this more accurate estimate $\tau_{peak}'$ in hand, the arrival time of a multipath signal peak can be estimated and this unwanted signal can be removed from the composite signal s(t) in Eq. (1).

II. A second approach uses a least squares estimation of the multipath signal strengths, using multiple samples $\{x(\tau_m)\}_m$ (preferably 10–30 such samples) of the correlation signal values. Each correlation function $x_k$ can be expressed as a sum $$x_k = \sum_{m=1}^{J} a_m \exp(j(\theta - \theta_m)) R(\tau_m - \tau_k') + e_k, \tag{19}$$

where $e_k$ is a measurement error. Here, $\tau_m$ is drawn from a set of correlator time value samples and $\tau_k'$ is drawn from a set (of estimated size K) for times of arrival at the receiver of direct and multipath signals. The quantities $R(\tau_m-\tau_k')$ have measurable, and thus known, values. Equation (19) represents K relations (k=1, 2, . . . , K) for the unknown complex variables $b_m = a_m \exp[j(\theta-\theta_m)]$, sometimes referred to as the complex path gains. Values for the complex path gains $b_m$ are chosen that minimize the sum of the pth powers of the residuals or errors $$\varepsilon_p = \sum_{k=1}^{K} \left[ x_k - \sum_{m=1}^{J} b_m R(\tau_m - \tau_k) \right]^p, \tag{20}$$

with p=2 preferred. The choices for the N×1 vector b with entries $b_m$ that produces this minimum is given by $$b = (R^{tr} R)^{-1} R^{tr} x, \tag{21}$$

where R is a J×N matrix with entries $R(\tau_m-\tau_k)$ and x is a J×1 vector whose entries are the measurable quantities $x_j$. This algorithm is relatively simple to apply and can identify situations where the correlation function has two or more local maxima and where the narrow sample spacing correlation values may straddle a false peak for this function. A difference signal $$\Delta s(t) = s(t) - \sum_{m=2}^{N} b_m p(t - \tau_m) \exp(j\omega t) \tag{22}$$

is then formed as an estimate of a multipath-free transmitted signal received at the receiver. The earliest time, $t=\tau_1$, is interpreted as the time of arrival of the direct signal.

III. In a least squares or least pth power approach, the times of arrival or path delays for the direct signal and of the multipath signal(s) are best determined separately. A first approach for estimating these path delays uses slope transition points to estimate the multipath parameters. The slope transition approach discussed here, and the cepstrum processing approach discussed below, allows determination of the time value $\tau=\tau_n$ corresponding to arrival of the direct signal and of each of the multipath signals that contribute to the composite received signal s(t) in Eq. (1), before the complex gain parameters $a_m \exp(j\theta_m)$ are determined. Once the full set of these time values $\{\tau_m\}_m$ is determined, determination of the complex gain parameters becomes a tractable linear problem, if a least squares method is used for such determination. Thus, use of the slope transition approach or of the cepstrum processing approach decomposes the problem of determination of the parameter sets $\{\tau_m\}_m$, $\{a_m\}_m$, and $\{\theta_m\}_m$ into two independent sub-problems, and one of these sub-problems merely requires solution of an array of linear equations.

Each slope transition point for a correlation function $R(\tau)$ is corresponds to a unique, somewhat sharper slope transition point for the error function $e(\tau-\tau_0;\tau_d;r)$ for $r \geq 1$. The slope transition points $t_s$ for the correlation function $R(\tau)$ can be found by visual inspection of the graph of the error function $e(\tau-\tau_0;\tau_d;r)$, or the slope transition points may be determined numerically by a microprocessor connected to a memory module that stores the quantities $R(\tau-\tau_0\pm\tau_d)$. A slope transition point need not be a local maximum of the correlation function $R(\tau)$.

FIG. 4 illustrates a representative correlation function $R(\tau)$ that might be generated for the total signal s(t) of Eq. (1). Here, the correlation function has a maximum at $\tau-\tau_0=0$ as before and manifests an abrupt change in slope at $\tau=\tau_0$, $\tau=\tau_0-0.7$ $T_c$ and at $\tau=\tau_0+0.35$ $T_c$, and the slope of the correlation function $R(\tau)$ for $\tau<\tau_0$ and for $\tau>\tau_0$ differ substantially from each other. Each time point $\tau=\tau_0+t_s$ in the domain of the correlation function where the function slope changes abruptly (e.g., where the two one-sided derivatives $(dR/d\tau)_{\tau_0+t_{s-0}}$ and $(dR/d\tau)_{\tau_0+t_{s+0}}$ are not equal, or where the magnitude of the difference of these derivatives exceeds a selected threshold number) is referred to herein as a "slope transition point". Each slope transition point $\tau=\tau_0+t_s$ potentially corresponds to a time of arrival $\tau_s=\tau_0+t_s$ (or $\tau_s=\tau_0+t_s+T_c$) of a distinct multipath contribution to the signal $S_M(t;N)$ in Eq. (1). By determining the number of, and the time values of each of, the slope transition points, one can identify the corresponding times $\tau_s=\tau_0+t_s$ and the integer N to be used in Eqs. (1) and (2) to construct the approximate function $S_M(t;N)$ in Eq. (1) representing the add-on signal that arrives at the embodiment 51 in FIG. 6.

Determination of the slope transition points $t_s$ and/or the time of arrival $\tau_0$ of the direct signal for the correlation signal $R(\tau)$ in Eq. (6) can be implemented in several ways. One approach examines the function $e(\tau-\tau_0;\tau_d;r)$ given in Eq. (10): the time values ts correspond to the zero crossing points $t_s$ at which the function $e(\tau-\tau_0;\tau_d;r)$ changes sign or abruptly changes value, where ts ranges over a selected sequence of time values in the domain $-T_c \leq t_s \leq T_c$ and r is a selected positive rational or irrational number (e.g., r=0.5, 1.0, 1.5, 2.0, √17 or π).

Figure 13A:
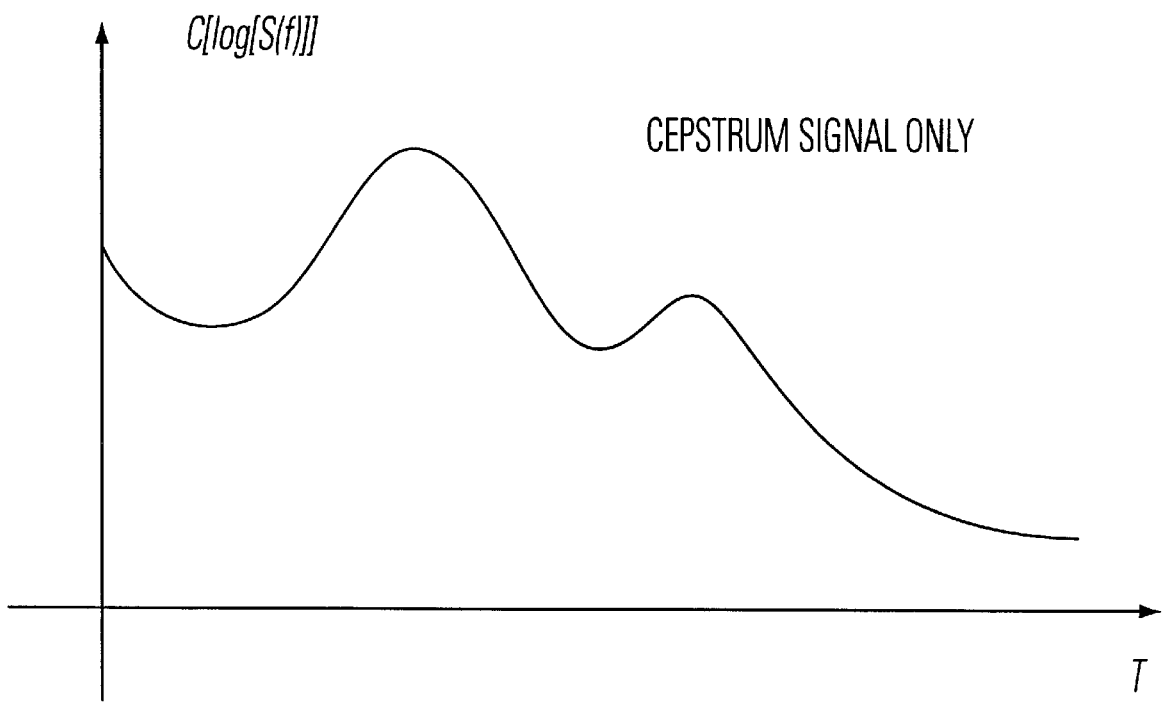
FIGS. 13A and 13B illustrate a cepstrum signal with no multipath signals present and in the presence of at least one multipath signal, respectively.
Figure 13B:
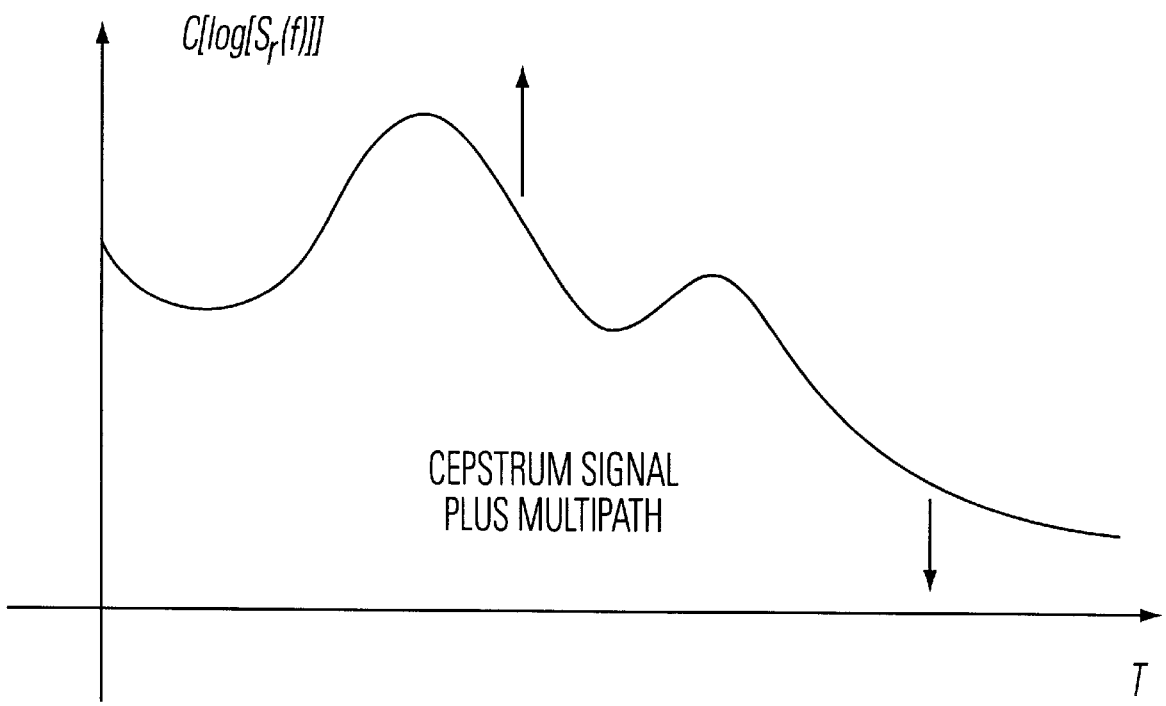
Figure 14:
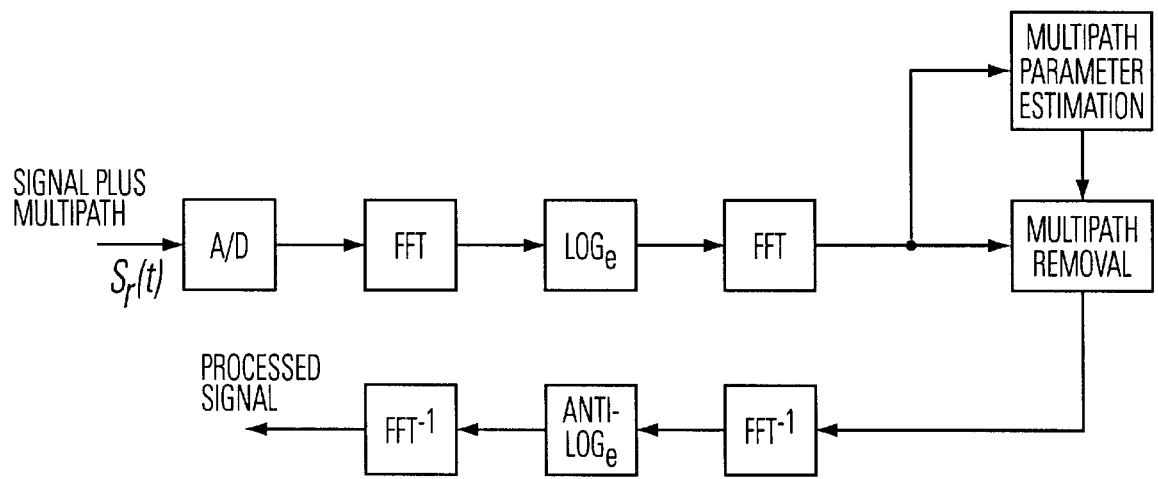
FIG. 14 illustrates apparatus suitable for removing one or more multipath signals from a signal using a cepstrum analysis approach.

IV. A second approach for estimation of path delays uses cepstrum processing, wherein the logarithm of the Fourier transform of the incident signal s(t) is formed and manipulated as indicated in FIG. 14 to identify certain parameters (here, time values τ for peaks, as in FIGS. 13A and 13B) of any multipath signals that are present. Assume, for purposes of illustration, that the signal s(t) includes a direct signal $s_0(t)$ and a single multipath signal contribution $s_1(t)$, as in Eq. (1) with N=1, viz.

$$s(t)=b_0 p(t-\tau_0)+b_1 p(t-\tau_1). \qquad (23)$$

$$b_m=a_m\exp(j(\theta_m-\theta^*)) \qquad (24)$$

The Fourier transform of Eq. (23) becomes $$S(f)=\Phi(s(t))=[b_0\exp(-j2\pi f\tau_0)+b_1\exp(-j2\pi f\tau 1)]P(f), \qquad (25)$$

$$P(f)=\Phi(p(t)), \qquad (26)$$

which yields a relation $$\Phi(S(t))=b_0\exp(-j2\pi f\tau_0)\ P(f)\ [\alpha 1\ \exp(j(2\pi f(\tau_1-\tau_0))+1]^{-1}, \qquad (27)$$

$$\alpha 1=b_1/b_0 (\text{assumed}<<1 \text{ in magnitude}). \qquad (28)$$

In cepstrum processing, one forms the logarithm (natural, Naperian or other) of each side of Eq. (27), which yields $$\log[\Phi(S(t))] = \qquad (29)$$
$$\log[b_0\exp(-j(2\pi f\tau_0)P(f)] - \sum_{m=1}^{\infty} [(-\alpha_1^m)/m]\exp[-j2m\pi f(\tau_1-\tau_0)].$$

The inverse Fourier transform of Eq. (29) is then formed, which yields $$\Phi^{-1}\{\log[\Phi(S(t))]\} = \Phi^{-1}\{\log[b_0\exp(-j2\pi f\tau_0)S(f)]\} - \qquad (30)$$
$$\sum_{m=1}^{\infty} [(-\alpha_1^m)/m]\delta(t-m(\tau_1-\tau_0))\},$$

where $\Phi^{-1}\{g(f)\}$ denotes the inverse Fourier transform of the function g(f) and $\delta(w)$ is a one-dimensional delta function. The first term on the right hand side of Eq. (30) represents the contribution of the direct signal, multiplied by a multiplier $b_0 \exp[-j2\pi f\tau_0]$. One effect of presence of a multipath signal (proportional to $\alpha_1$) is the appearance of an infinite series of approximately equally spaced delta functions centered at the time values $t=m(\tau_1-\tau_0)$ (m=1, 2, . . . ). This infinite series can be used to estimate the path delays $\tau_m$ associated with arrival of one or more multipath signals.

After the path delays $\tau_m$ are determined using the slope transition method or the cepstrum processing method, a least squares estimation method (second approach) can be used to determine the complex path gains and to determine an estimate of the multipath signal. This estimate can be subtracted from the received signal to produce a signal that is substantially multipath-free. The signal receiver can then estimate the arrival time of the multipath-free signal, with reduced multipath errors therein.

V. Another, more direct, approach for determining the path delays, or arrival times for the direct and multipath signals, begins with a selected grid or sequence of time values $\{\tau_g\}_g$ (g=1, 2, . . . , G) along the interval $-T_c \leq t \leq T_c$ and minimizes the quantity $\epsilon_p$ in Eq. (20) for this sequence, where the time values $\tau_m$ in Eq. (20) are now drawn from this grid of values $\{\tau_g\}_g$. This minimization produces an G×1 vector b of complex gain values, defined by Eq. (20). This approach seeks to identify the largest values of the complex path gain magnitudes $|b_g|$, according to some algorithm or other identification procedure.

One method used with this approach arranges the magnitudes $|b_g|$ of the complex path gains in decreasing order of the magnitudes and chooses a subset of H complex path gains $b_h$ with the largest magnitudes (h=1, 2, ..., H), where H is a selected positive integer. The time values $\tau_h$ corresponding to these complex path gains $b_h$ are identified as the times of arrival of the direct signal (largest path gain magnitude) and of the multipath signals.

A second method here again arranges the magnitudes $|b_g|$ of the complex path gains in decreasing order of the magnitudes and selects all complex path gains $b_h$ satisfying the relation $$|b_n| \geq \delta, \quad (31)$$

where $\delta$ is a selected threshold number, with the largest path gain magnitude corresponding to the time of arrival of the direct signal.

A third method here arranges the magnitudes $|b_g|$ of the complex path gains in decreasing order of the magnitudes, written in that order as $$|b_{g1}| \geq |b_{g2}| \geq |b_{g3}| \geq \ldots, \quad (32)$$

and defines $$\Delta b_k = |b_{gk}| - |b_{g(k+1)}| \geq 0, \quad (33)$$

$$m(b) = \min_k(\Delta b_k), \quad (34)$$

$$M(b) = \max_k(\Delta b_k). \quad (35)$$

One then seeks the largest number $\mu(b)$ lying in the range $m(b) \leq \mu(b) \leq M(b)$ for which $$\Delta b_k \geq \mu(b) (k=1, 2, \ldots, K) \quad (36)$$

for a consecutive sequence of K magnitude differences $\Delta b_k$ and chooses the time values $\tau_{g1}, \tau_{g2}, \ldots, \tau_{gK}$ as the times of arrival of the direct and multipath signals. The integer K is not chosen a priori but is determined by the requirement associated with Eq. (36). Equation (36) is always satisfied by at least one value, namely $\mu(b) = \Delta b_1 = |b_{g1}| - |b_{g2}|$. Any of these three methods, and others as well, can be used to estimate a reasonable number of arrival times for the direct and multipath signals.

If the grid or sequence of time values $\{\tau_g\}_g$ is a uniformly spaced grid with a nearest neighbor spacing of $\Delta\tau \approx 2T_c/G$, the maximum error in the direct signal time of arrival is estimated as $\Delta\tau/2$. One can choose the grid spacing $\Delta\tau$ so that this maximum error is no larger than an acceptable amount.

As an enhancement, this uniform grid, centered at an estimated arrival time $t=\tau_{g1}$, may be replaced by a uniform grid $g(j;J;\Delta t)$ with about the same gris spacing, with grid markers $\tau_{g1}(j)$ that are each translated by a distance $(j/J)(T_c/G)$ to the right (or to the left) of the grid marker of interest, $t=\tau_{g1}$, with $j=0, 1, \ldots, J-1$. The time of arrival of the direct signal is then the time $\tau_{g1}(j')$ that corresponds to the integer value j' for which $\tau_{g1}(j') = \max_{1 \leq j \leq J-1} \tau_{g1}(j)$. With this alternative adopted, the maximum error in the direct signal time of arrival is reduced further, to $\Delta\tau/J$. This grid translation process corresponds to imposing a finer grid, with separation distance $T_c/GJ$, in a neighborhood of the grid marker of interest, $t=\tau_{g1}$, and repeating the preceding computations to obtain a better estimate of the direct signal arrival time.

Figure 15:
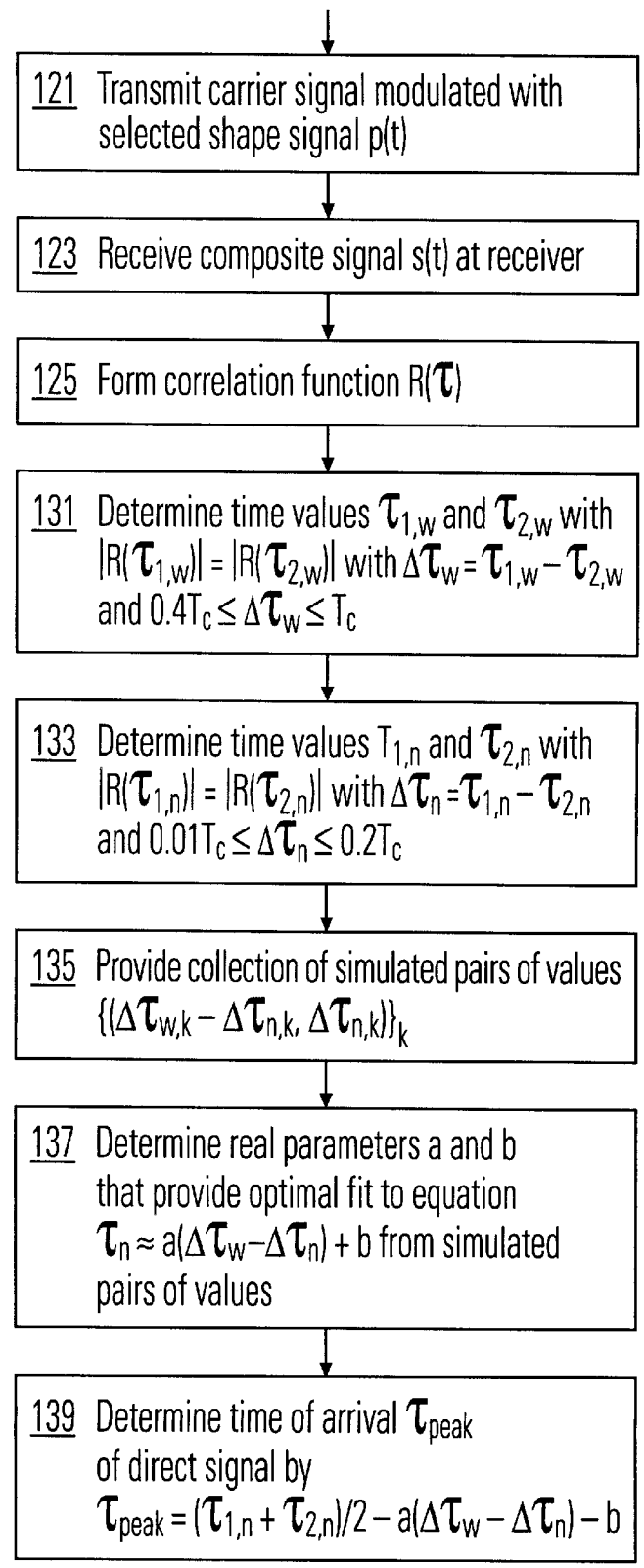
FIGS. 15, 16 and 17 are flow charts illustrating procedures for three embodiments of the invention.

FIG. 15 is a flow chart illustrating a first embodiment of the invention, in which wide and narrow correlator function sampling is used to identify the time value corresponding to a correlator peak value. In step 121, a carrier signal with selected frequency $f=\omega/2\pi$, modulated with a selected shape signal p(t) at a selected frequency $f_c=1/T_c$, is transmitted. In step 123, the transmitted signal is received as a composite signal, containing the direct signal and multipath signals, at a receiver. In step 125, a correlation function $R(\tau)$ is formed as in Eq. (6).

In steps 131 and 133, time values $\tau_{1,w}, \tau_{2,w}, \tau_{1,n}$ and $\tau_{2,n}$, are determined that satisfy the constraints $|R(\tau_{1,w})| = |R(\tau_{2,w})|$ and $|R(\tau_{1,n})| = |R(\tau_{2,n})|$ with $\Delta\tau_w = \tau_{1,w} - \tau_{2,w}$ and $\Delta\tau_n = \tau_{1,n} - \tau_{2,n}$ and $0.4T_c \leq \Delta\tau_w \leq T_c$ and $0.01T_c \leq \Delta\tau_w \leq 0.2T_c$. In step 135, a collection of simulated pairs of values $\{(\Delta\tau_{w,k} - \Delta\tau_{n,k}, \Delta\tau_{n,k}))\}_k$ is provided. In step 137, real parameters a and b are determined that provide an optimal fit to the equation $\Delta\tau_n \approx (\Delta\tau_w - \Delta\tau_n) + b$ for this collection of simulated pairs of values. In step 139, a time of arrival, $\tau_{peak}$, of the direct signal is estimated by the equation $\tau_{peak} = (\tau_{1,n} + \tau_{2,n})/2 - a(\Delta\tau_w - \Delta\tau_n) - b$.

Figure 16:
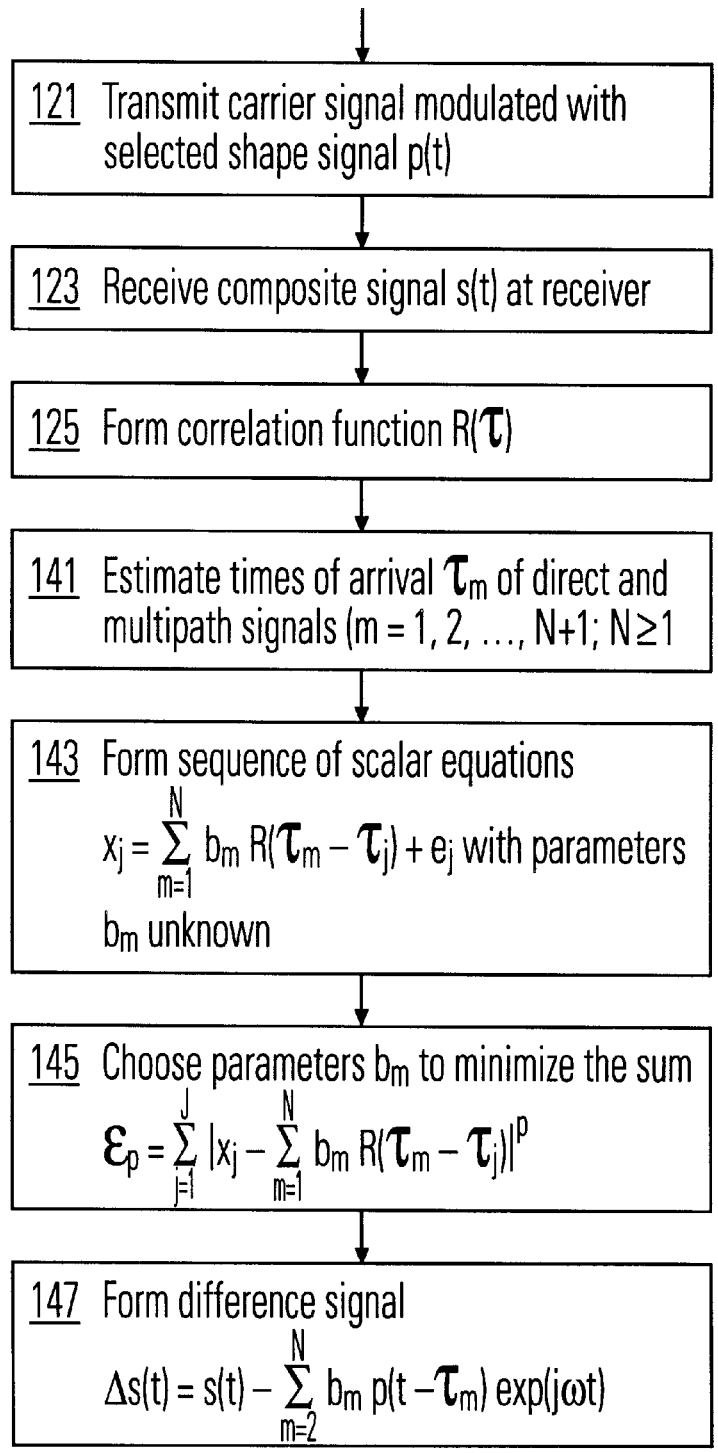

FIG. 16 is a flow chart illustrating a second embodiment of the invention, using minimization of the difference between the received signal and a sum of replicas of the shape signal p(t) with unknown weights. In FIG. 16, steps 121, 123 and 125 are as in FIG. 15. In step 141, estimates of the times of arrival $\tau_m$ (m=1, 2, ..., N+1; N$\geq$1) of the direct signal and one or more multipath signals are obtained independently, using, for example, a method such as identification of slope transition points or Cepstrum processing, as discussed above. In step 143, a sequence of scalar equations is formed as in Eq. (19). In step 145, a pth power difference, given in Eq. (19), is minimized with respect to choice of the parameters $b_m = a_m \exp[j(\theta - \theta_m)]$. In step 147, a difference signal $\Delta s(t)$ is formed as in Eq. (22), as an estimate of a multipath-free signal received at the receiver.

Figure 17:
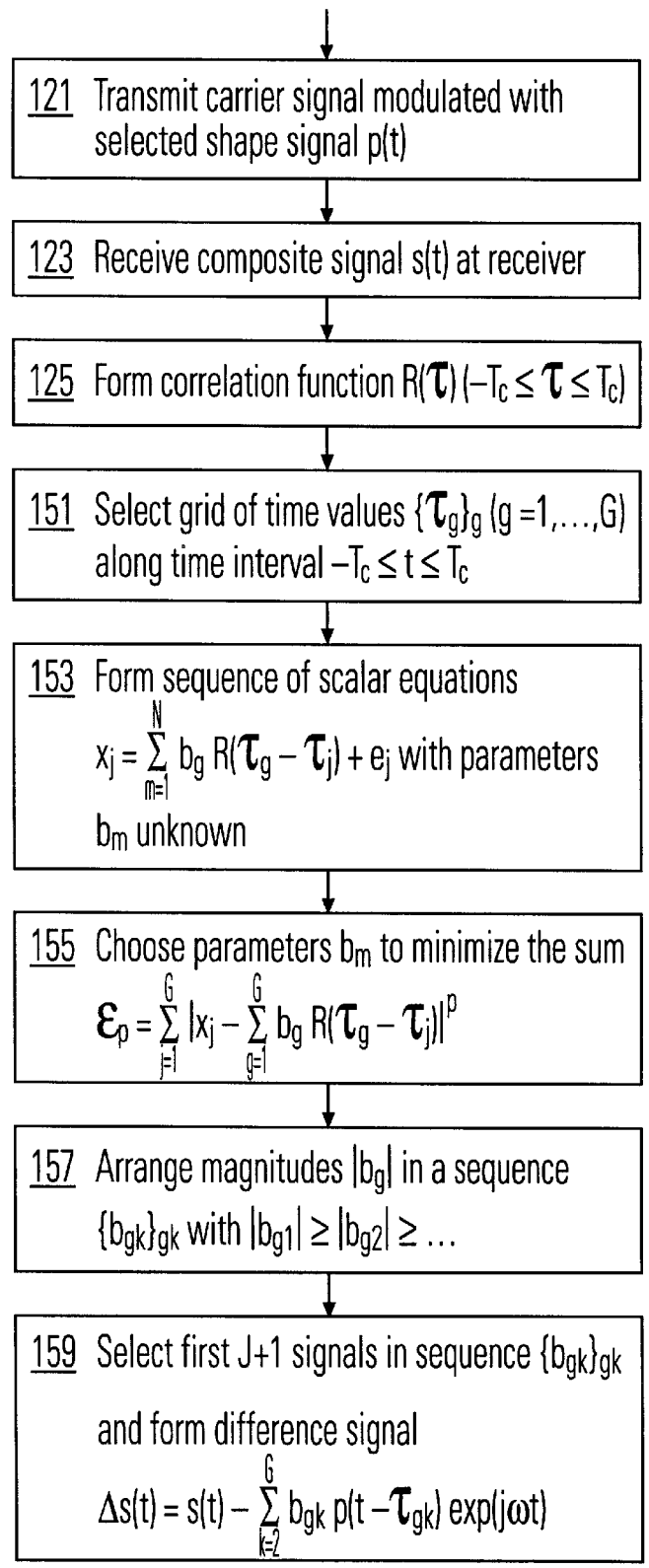

FIG. 17 is a flow chart illustrating a third embodiment of the invention, which uses a pre-selected grid of time values $\{\tau_g\}_g$. In FIG. 17, steps 121, 123 and 125 are as in FIG. 15. In step 151, a grid of time values $\{t_g\}_g$ (g=1, 2, ..., G) is chosen along the time interval $-T_c \leq t \leq T_c$. In step 153, a sequence of scalar equations is formed as in Eq. (19), with the time values tm and tk being drawn from the grid $\{\tau_g\}_g$. In step 155, the parameters $b_g$ are chosen to minimize the pth power difference given in Eq. (21). In step 157, the magnitudes $|b_g|$ of these determined parameters are arranged in a sequence $\{\tau_{gk}\}_{gk}$, of decreasing magnitudes with $|b_{g1}| \geq |b_{g2}| \geq |b_{g3}| \geq \ldots$. In step 159, the first N+1 signals in the sequence $\{\tau_{gk}\}_{gk}$ are selected and a difference signal given in the form of Eq. (22) is adopted as an estimate of a multipath-free signal received at the receiver.

We claim:

1. A method for compensating for the presence of one or more multipath signals in an electromagnetic signal received at a receiver, the method comprising the steps of:

receiving at a receiver a composite incoming signal that is the result of propagation, over one or more propagation paths, of a transmitted message signal having a selected transmitted signal frequency and having a selected code shape signal with a code shape signal chip duration;

forming a correlation function, having a selected time shift variable, between the incoming signal and the code shape signal over a selected time interval that includes at least one code shape signal chip duration;

determining first and second distinct time shift values that produce equal amplitudes of the correlation function, using a difference between the second and first time shift values that is at least about 40 percent of the length of the code shape signal chip duration, and computing a wide time shift average $\Delta\tau_{w,avg}$ of the first and second time shift values;

determining third and fourth distinct time values that produce equal amplitudes of the correlation function, using a positive difference between the fourth and third time shift values that is no larger than about 20 percent of the length of the code shape signal chip duration, and computing a narrow time shift average $\Delta\tau_{n,avg}$ of the third and fourth time shift values;

forming a wide time shift difference between the wide time shift average and a selected peak time shift value for the maximum amplitude of the correlation function, and a narrow time shift difference between the narrow time shift average and the selected time shift peak value, where the selected peak time shift value is to be determined;

providing a collection of pairs first and second coordinates, where the first coordinate is a simulated value of a difference between the wide time shift difference and the narrow time shift difference, and the second coordinate is the narrow time shift difference;

determining an optimal linear approximation of each simulated second coordinate in the collection by the corresponding simulated first coordinate in the collection;

using the optimal linear approximation to estimate a peak time shift value; and interpreting the peak time shift value as a time of arrival of a direct signal at the receiver.

2. Apparatus for compensating for the presence of one or more multipath signals in an electromagnetic signal received at a receiver, the apparatus comprising:

a computer that receives a composite incoming signal that is the result of propagation, over one or more propagation paths, of a transmitted message signal having a selected transmitted signal frequency and having a selected code shape signal with a code shape signal chip duration, where the computer is programmed:

to form a correlation function, having a selected time shift variable, between the incoming signal and the code shape signal over a selected time interval that includes at least one code shape signal chip duration;

to determine first and second distinct time shift values that produce equal amplitudes of the correlation function, using a difference between the second and first time shift values that is at least about 40 percent of the length of the code shape signal chip duration, and computing a wide time shift average $\Delta\tau_{w,avg}$ of the first and second time shift values;

to determine third and fourth distinct time values that produce equal amplitudes of the correlation function, using a positive difference between the fourth and third time shift values that is no larger than about 20 percent of the length of the code shape signal chip duration, and computing a narrow time shift average $\Delta\tau_{n,avg}$ of the third and fourth time shift values;

to form a wide time shift difference between the wide time shift average and a selected peak time shift value for the maximum amplitude of the correlation function, and a narrow time shift difference between the narrow time shift average and the selected time shift peak value, where the selected peak time shift value is to be determined;

to provide a collection of pairs first and second coordinates, where the first coordinate is a simulated value of a difference between the wide time shift difference and the narrow time shift difference, and the second coordinate is the narrow time shift difference;

to determine an optimal linear approximation of each simulated second coordinate in the collection by the corresponding simulated first coordinate in the collection;

to use the optimal linear approximation to estimate a peak time shift value; and to interpret the peak time shift value as a time of arrival of a direct signal at the receiver.

* * * * *